(12) United States Patent
Lee et al.

(10) Patent No.: US 10,136,429 B2
(45) Date of Patent: Nov. 20, 2018

(54) METHOD FOR TRANSMITTING AND RECEIVING AUDIO DATA IN WIRELESS COMMUNICATION SYSTEM SUPPORTING BLUETOOTH COMMUNICATION AND DEVICE THEREFOR

(71) Applicant: LG ELECTRONICS INC., Seoul (KR)

(72) Inventors: Jaeho Lee, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/323,677

(22) PCT Filed: Apr. 28, 2015

(86) PCT No.: PCT/KR2015/004251
§ 371 (c)(1),
(2) Date: May 1, 2017

(87) PCT Pub. No.: WO2016/003064
PCT Pub. Date: Jan. 7, 2016

(65) Prior Publication Data
US 2017/0251469 A1    Aug. 31, 2017

Related U.S. Application Data

(60) Provisional application No. 62/020,400, filed on Jul. 3, 2014.

(51) Int. Cl.
*H04B 5/00* (2006.01)
*H04W 72/04* (2009.01)
(Continued)

(52) U.S. Cl.
CPC .......... *H04W 72/0446* (2013.01); *H04L 1/16* (2013.01); *H04L 5/0055* (2013.01); *H04W 4/80* (2018.02);
(Continued)

(58) Field of Classification Search
CPC ... H04W 4/008; H04W 72/0446; H04W 4/80; H04W 52/0241; H04W 84/20; H04L 1/16; H04L 5/0055
(Continued)

(56) References Cited

U.S. PATENT DOCUMENTS

2013/0003630 A1   1/2013   Xhafa et al.
2013/0045684 A1   2/2013   Linde et al.
(Continued)

FOREIGN PATENT DOCUMENTS

WO   WO 2013/062717 A1   5/2013
WO   WO 2014/076527 A1   5/2014

*Primary Examiner* — Eugene Yun
(74) *Attorney, Agent, or Firm* — Birch, Stewart, Kolasch & Birch, LLP

(57) ABSTRACT

A method for transceiving audio data by using Bluetooth low energy in a wireless communication system supporting Bluetooth communication by a first device, includes: establishing at least one isochronous channel for transmitting isochronous data with at least one second device; and transmitting the audio data to at least one second device through at least one established isochronous channel during a first interval.

16 Claims, 24 Drawing Sheets

(51) Int. Cl.
  *H04L 5/00* (2006.01)
  *H04W 52/02* (2009.01)
  *H04L 1/16* (2006.01)
  *H04W 4/80* (2018.01)
  *H04W 84/20* (2009.01)
(52) U.S. Cl.
  CPC ........ *H04W 52/0241* (2013.01); *H04W 84/20* (2013.01)
(58) Field of Classification Search
  USPC ....................................................... 455/41.1
  See application file for complete search history.

(56) References Cited

U.S. PATENT DOCUMENTS

2014/0086125 A1    3/2014   Polo et al.
2015/0326274 A1\*  11/2015  Flood .................. H04B 1/7143
                                                      375/132

\* cited by examiner

【Figure 1】
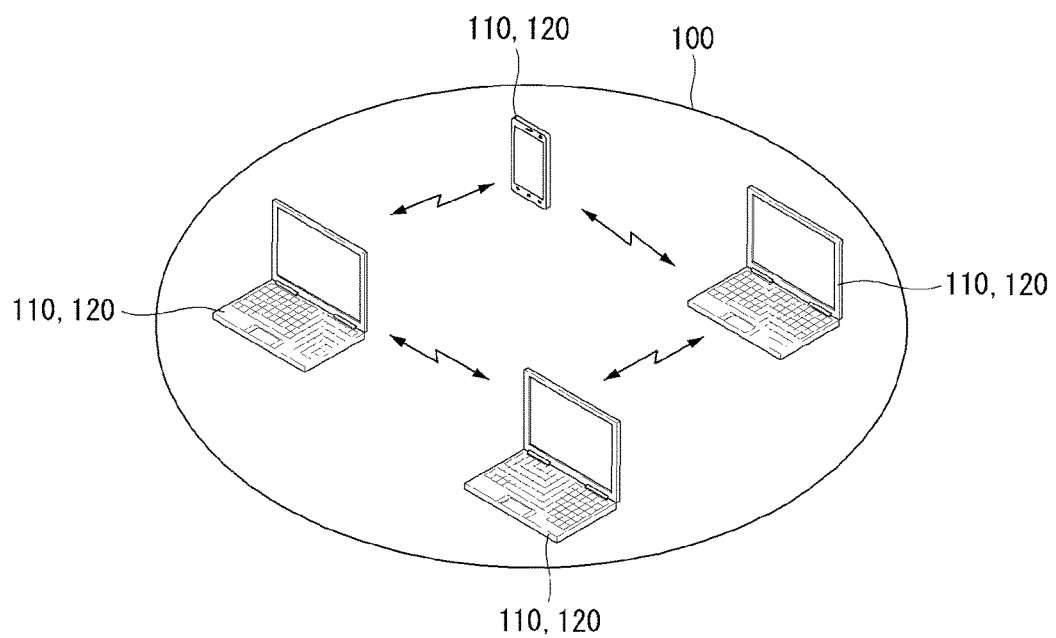

[Figure 2]
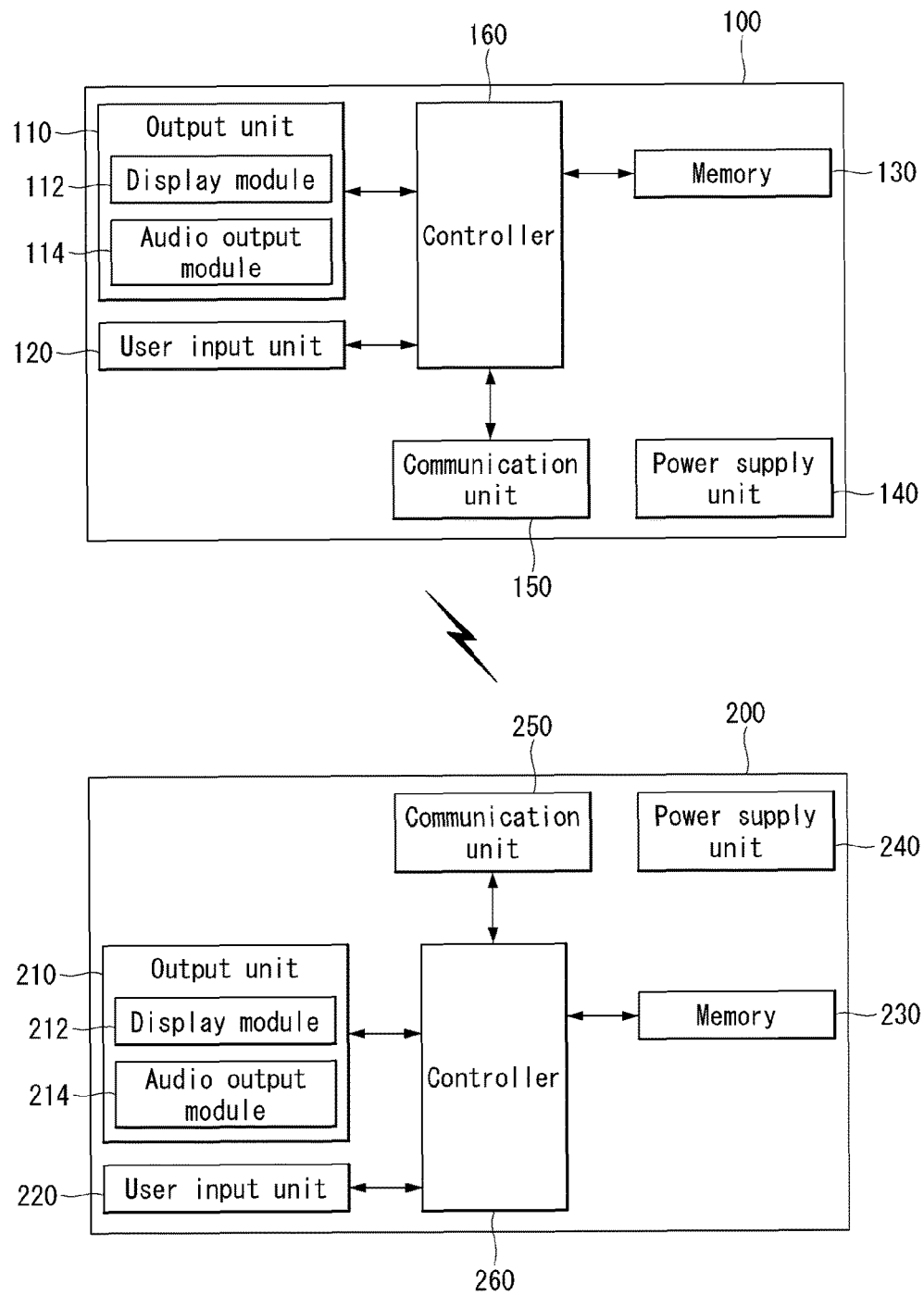

[Figure 3]
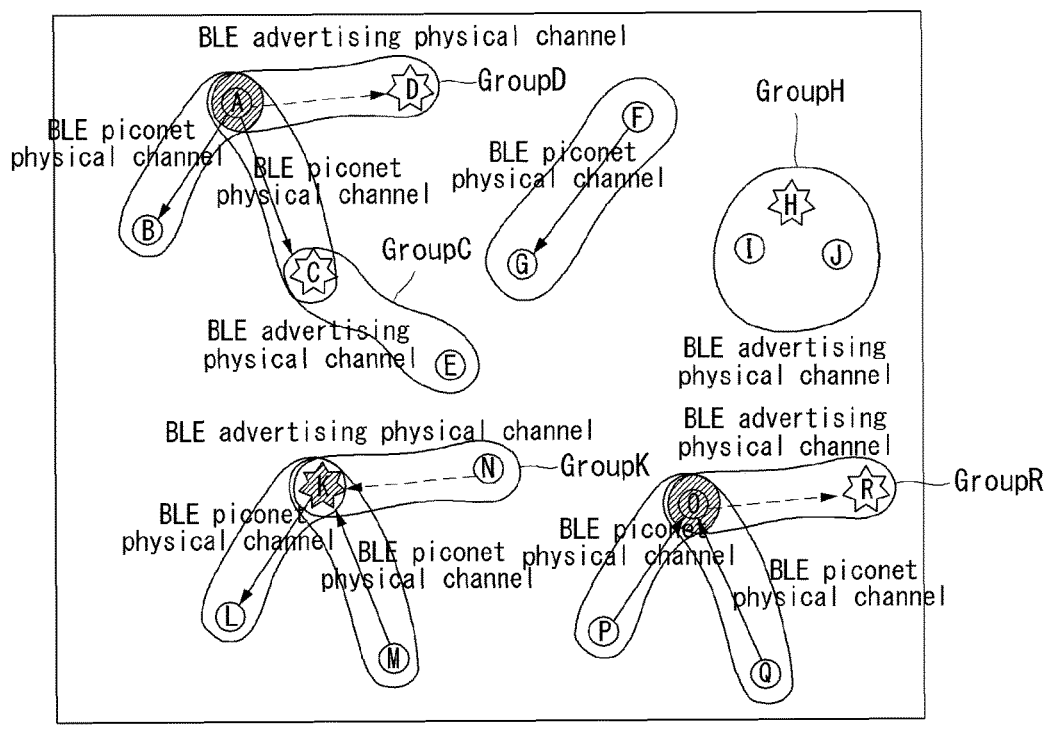

[Figure 4]
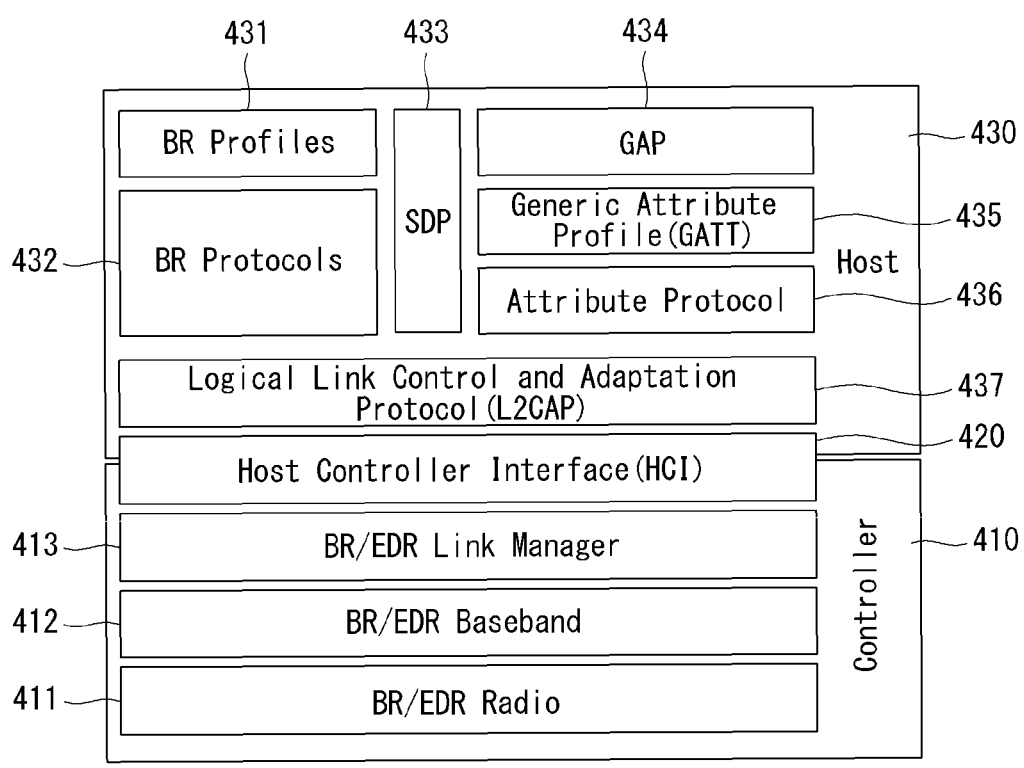

[Figure 5]
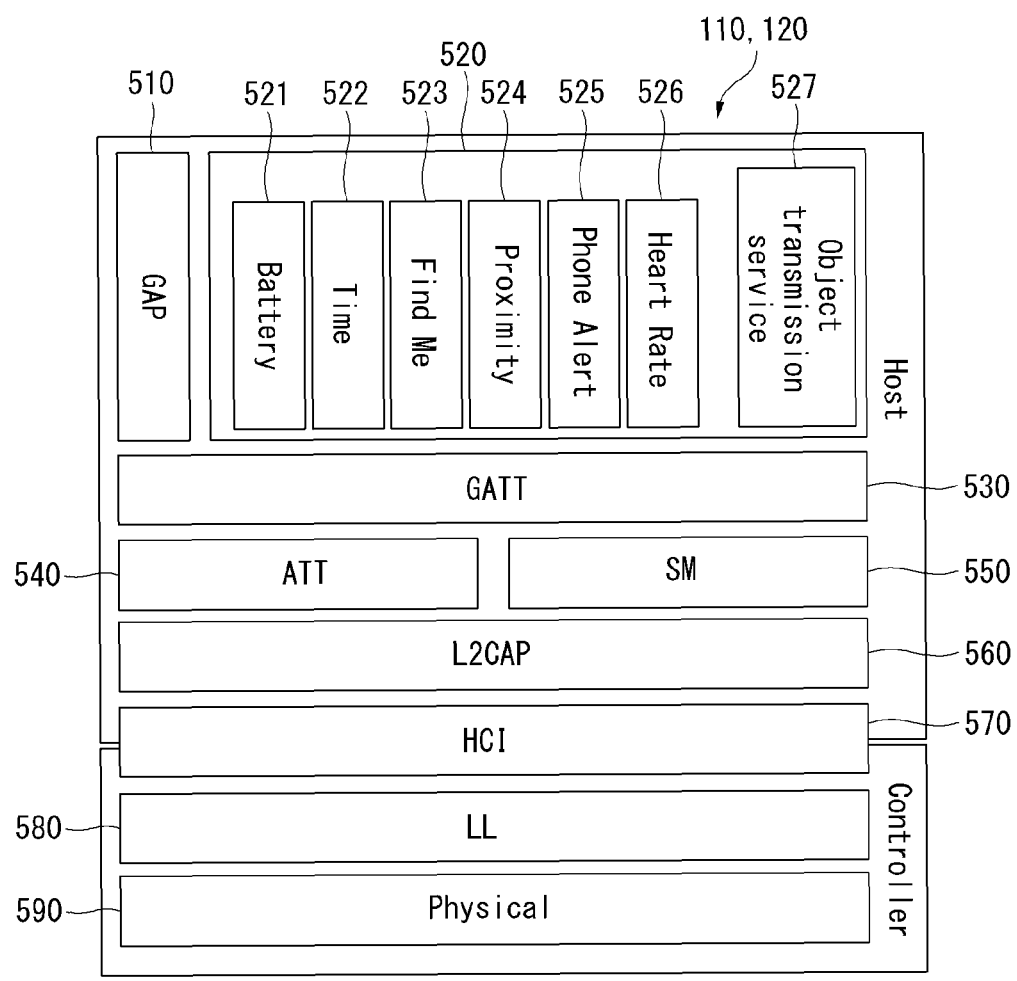

[Figure 6]
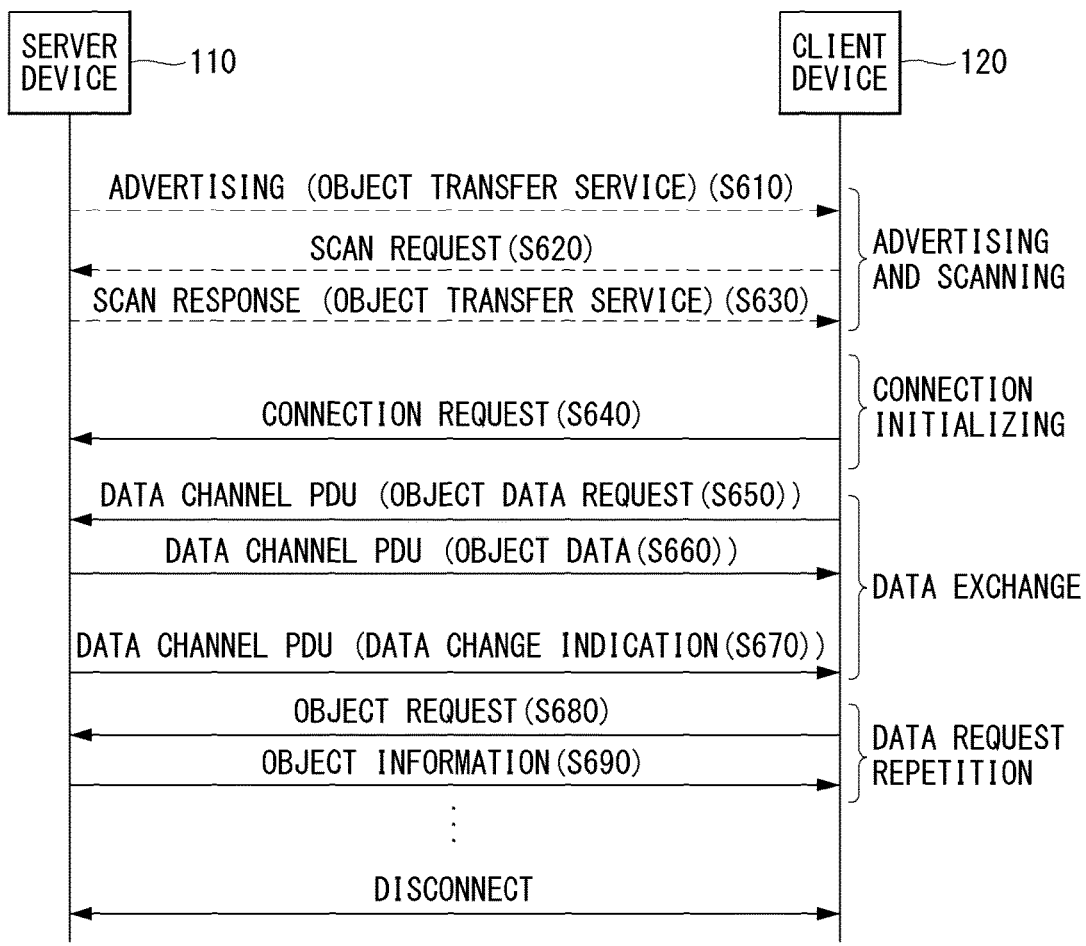

[Figure 7]
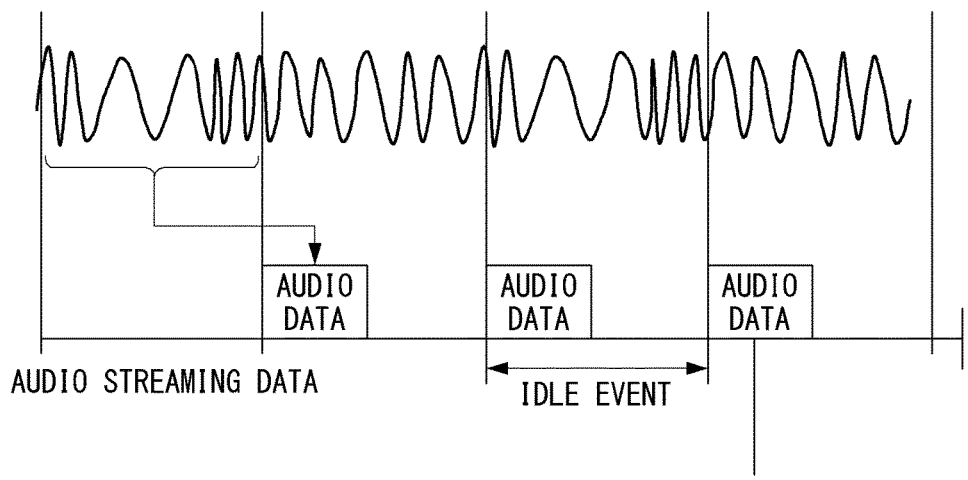
[Figure 8]
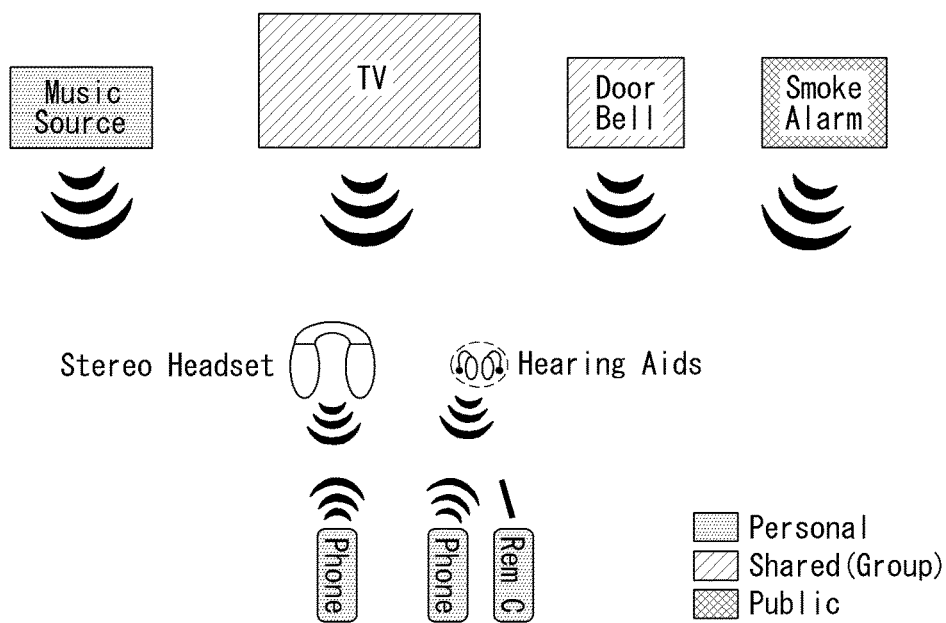

【Figure 9】
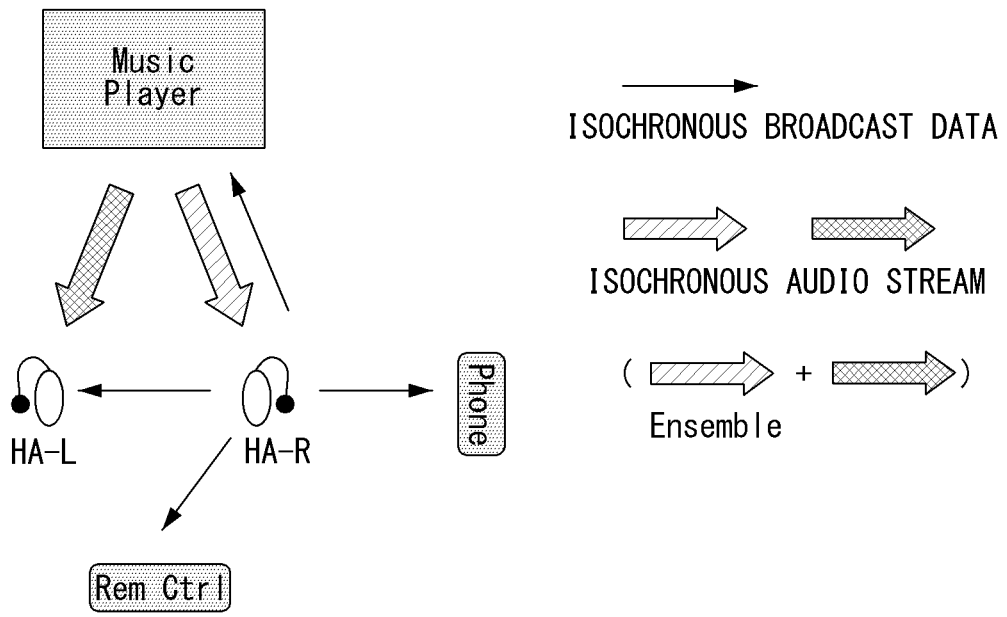
【Figure 10】
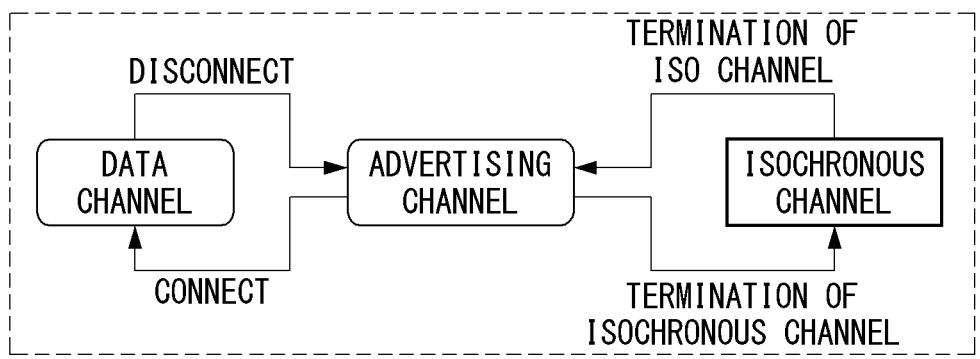

[Figure 11]
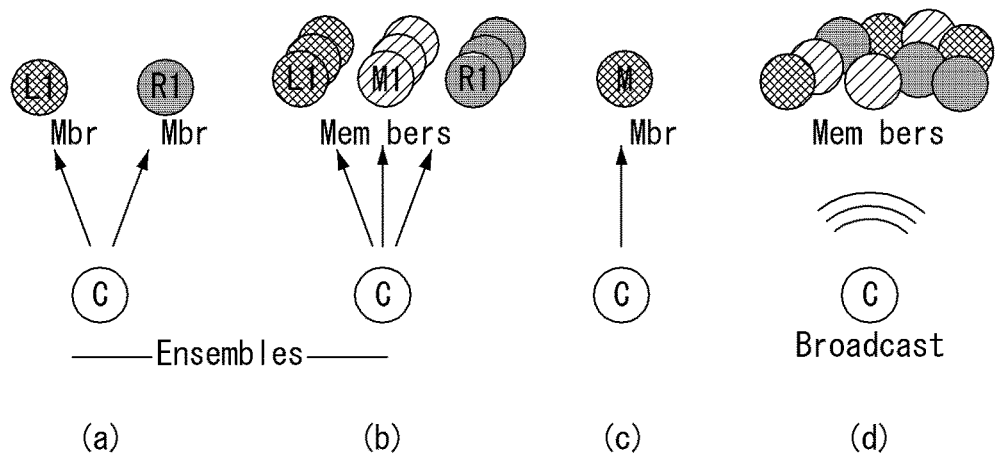
(a)  (b)  (c)  (d)
[Figure 12]
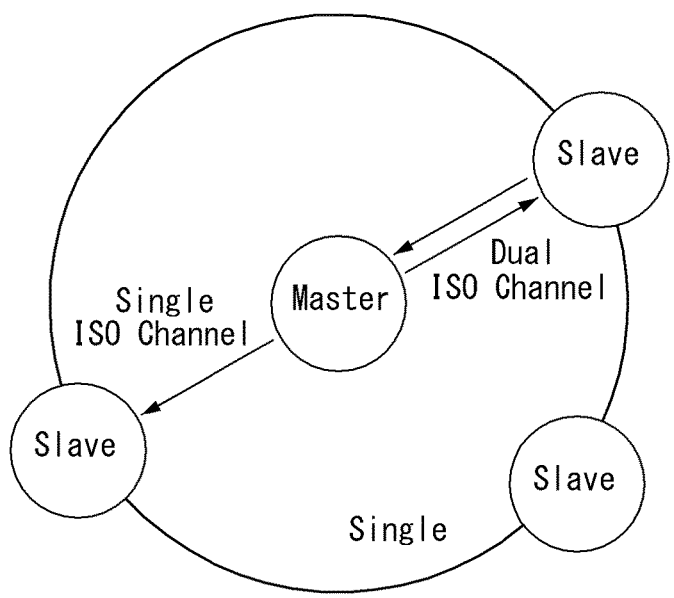

【Figure 13】
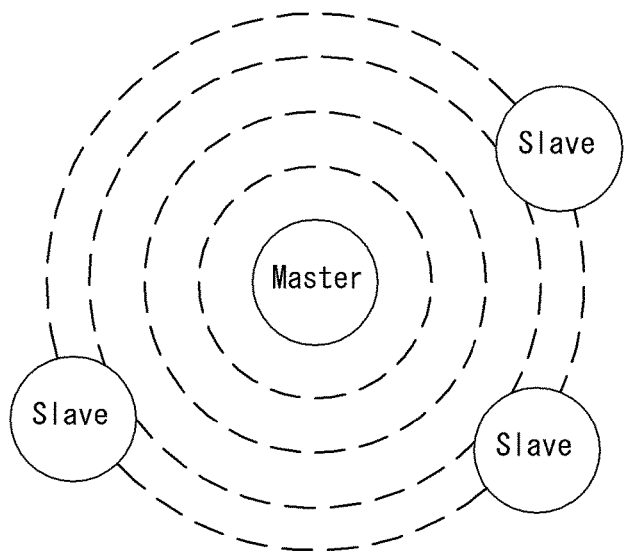
【Figure 14】
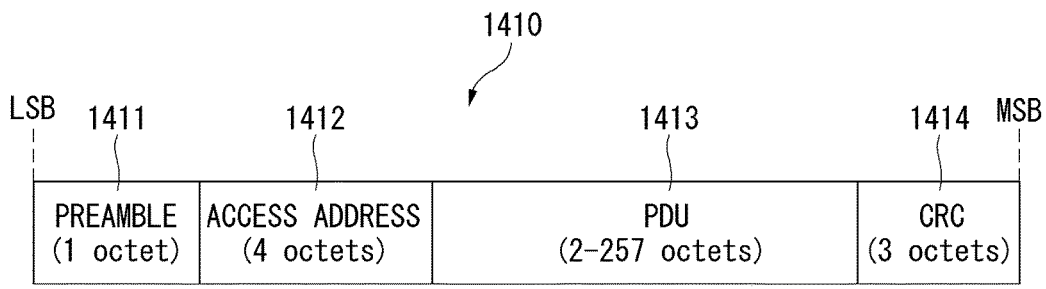
(a)
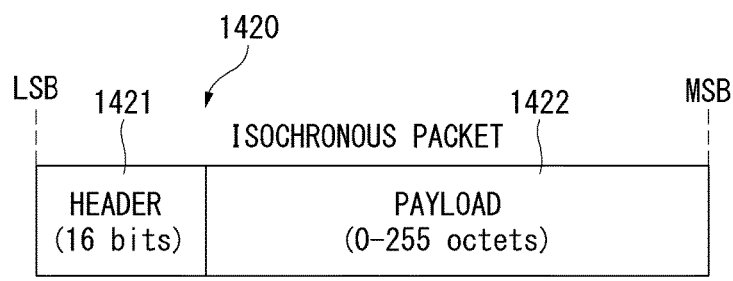
(b)

【Figure 15】
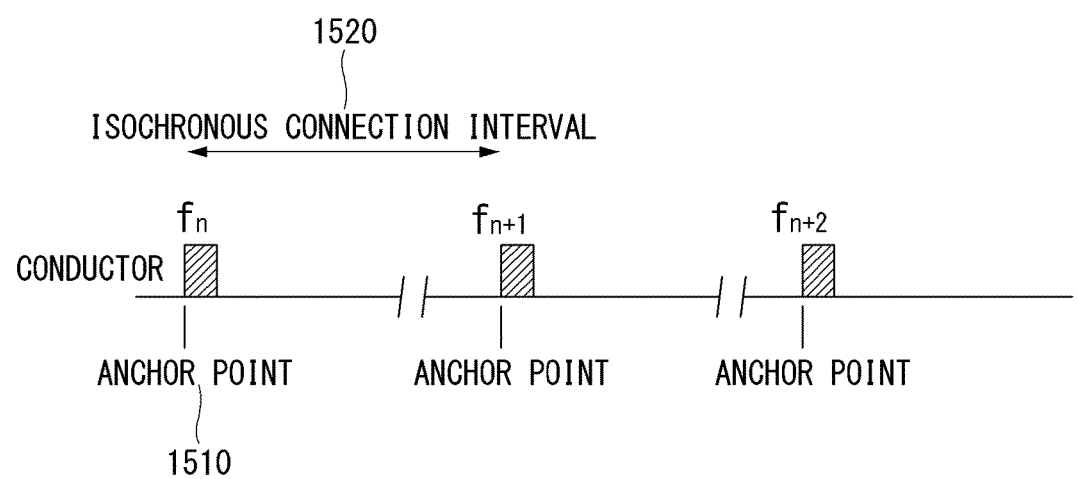

[Figure 16]
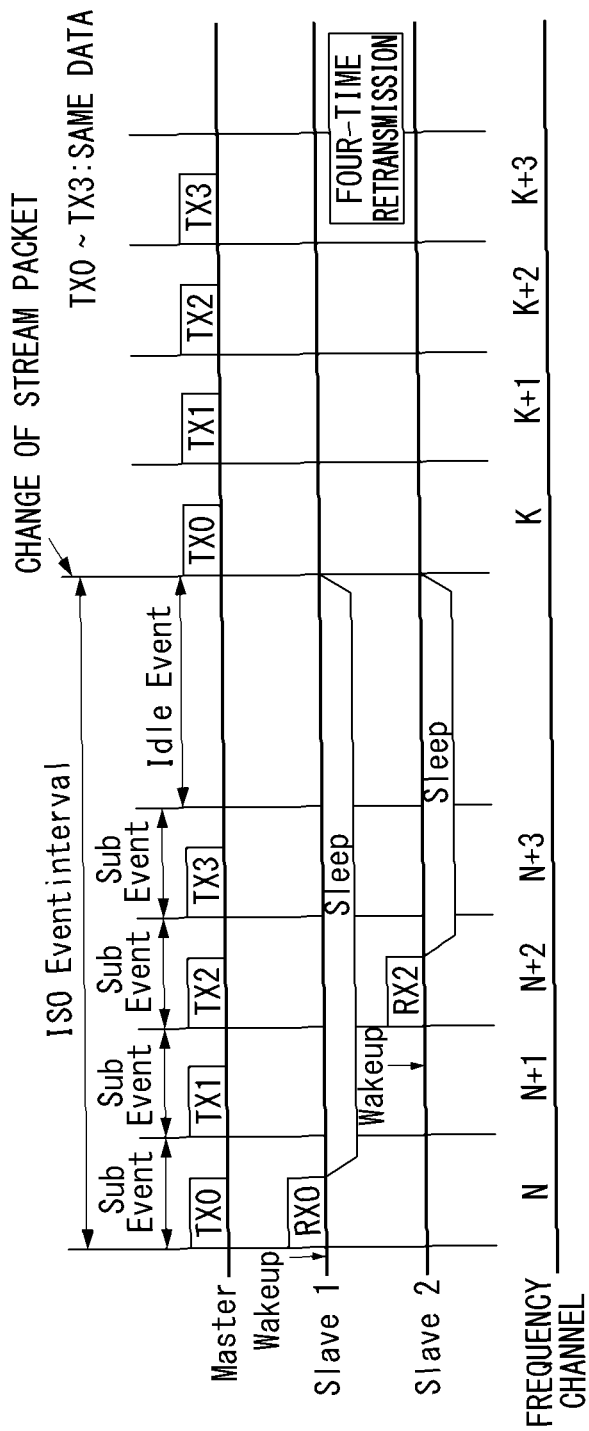

[Figure 17]
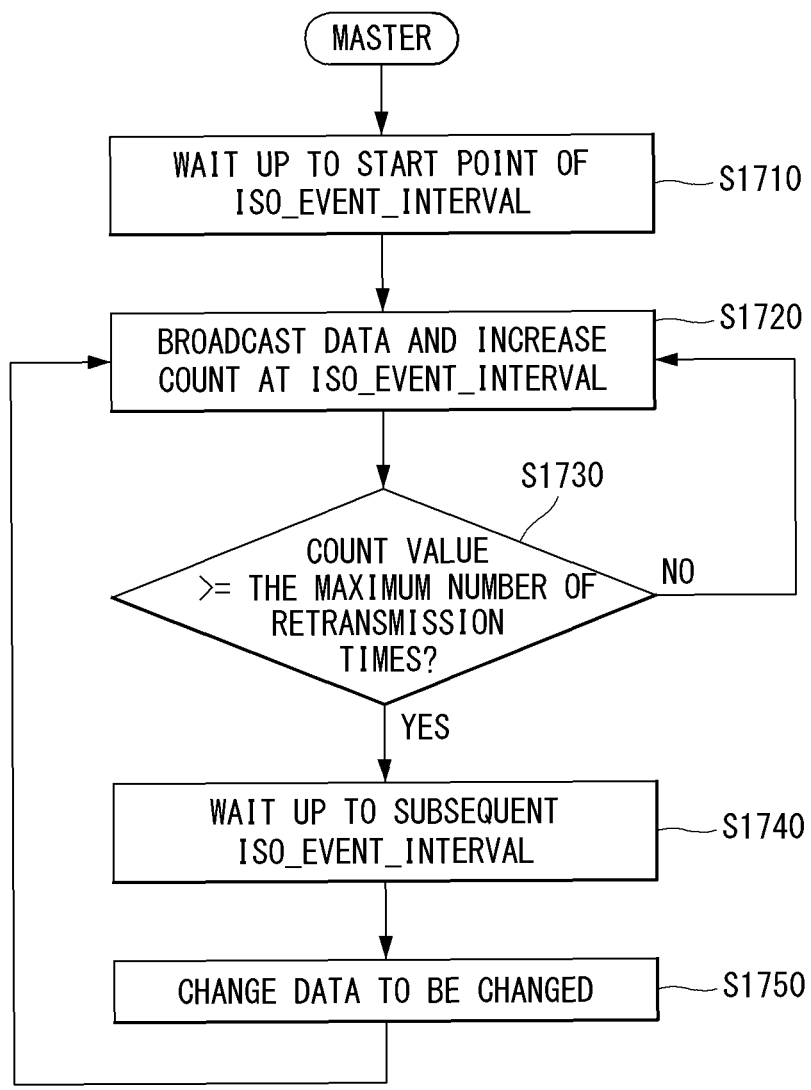

[Figure 18]
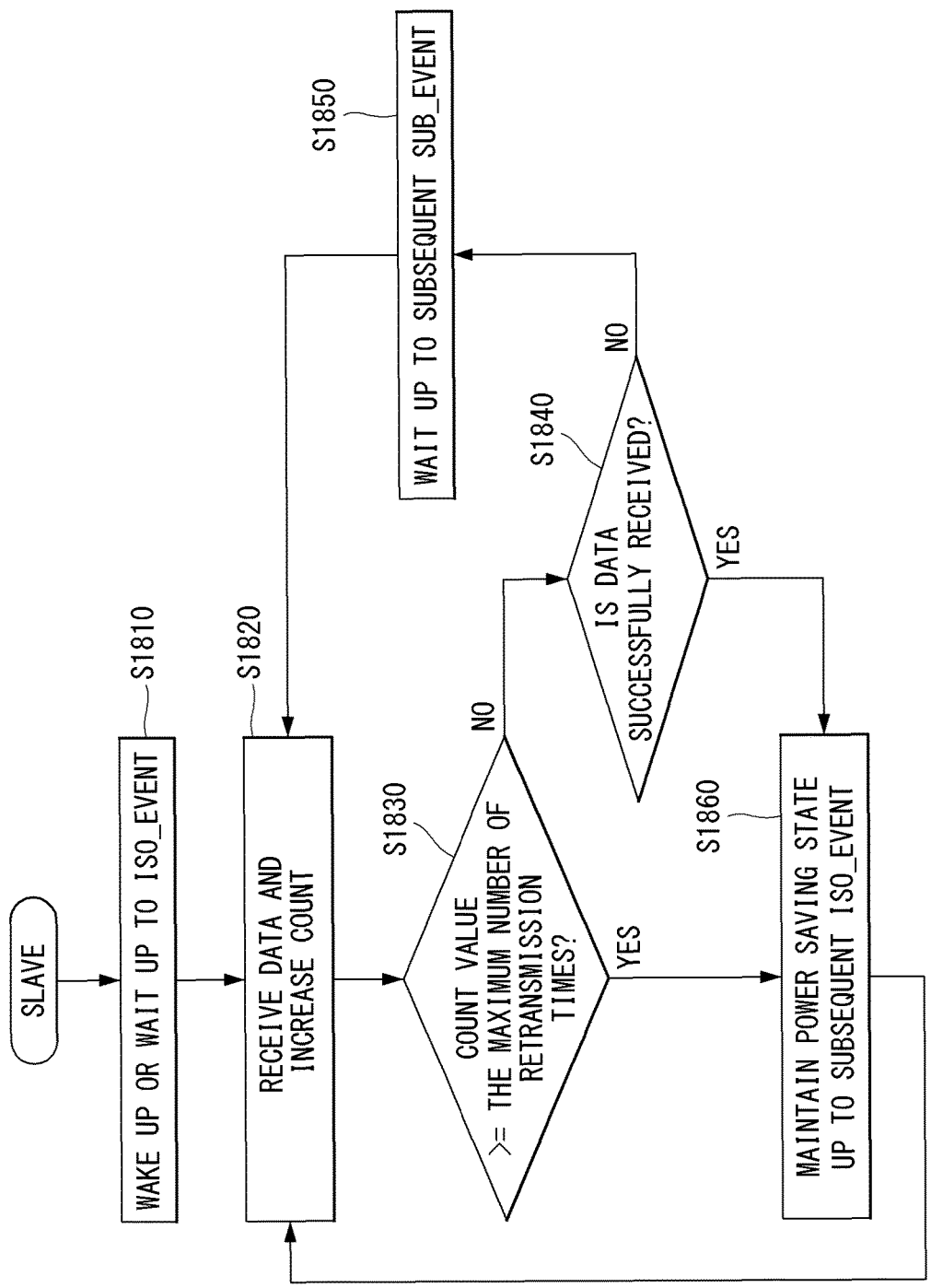

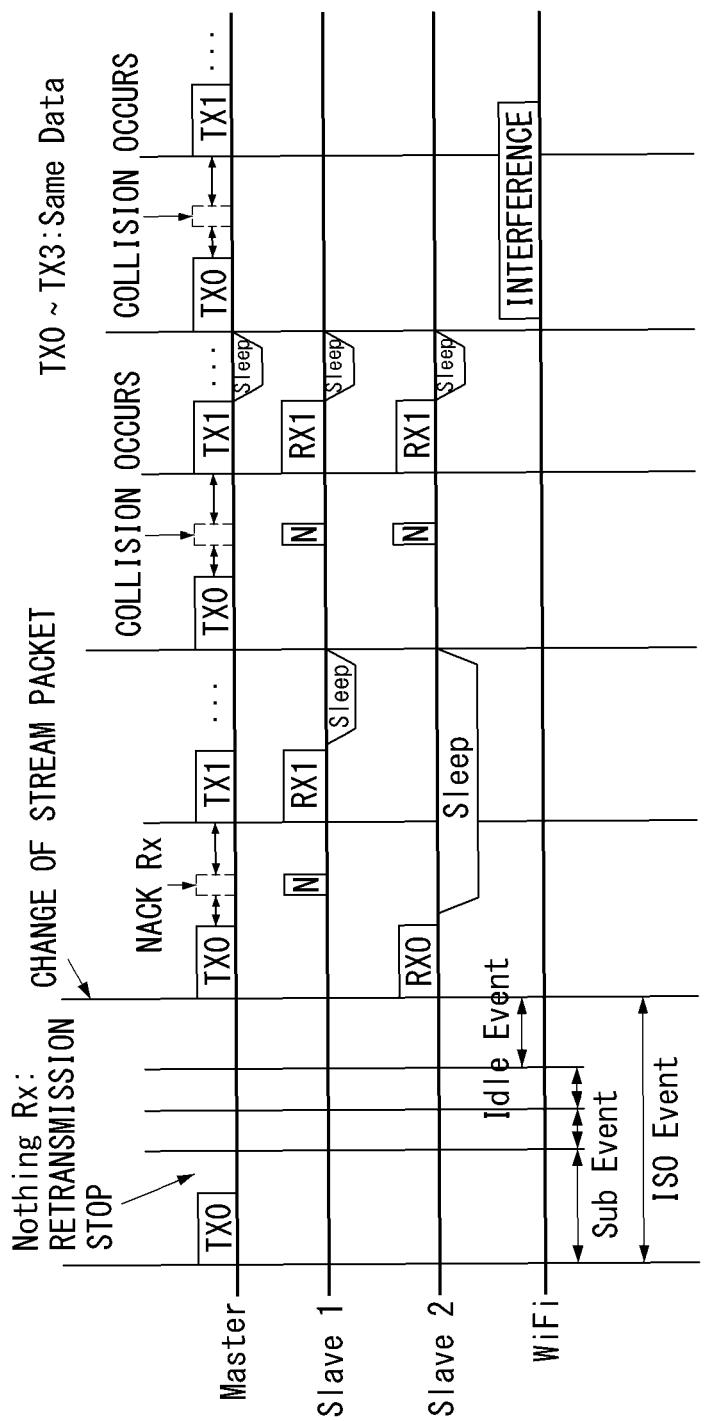
[Figure 19]

[Figure 20]
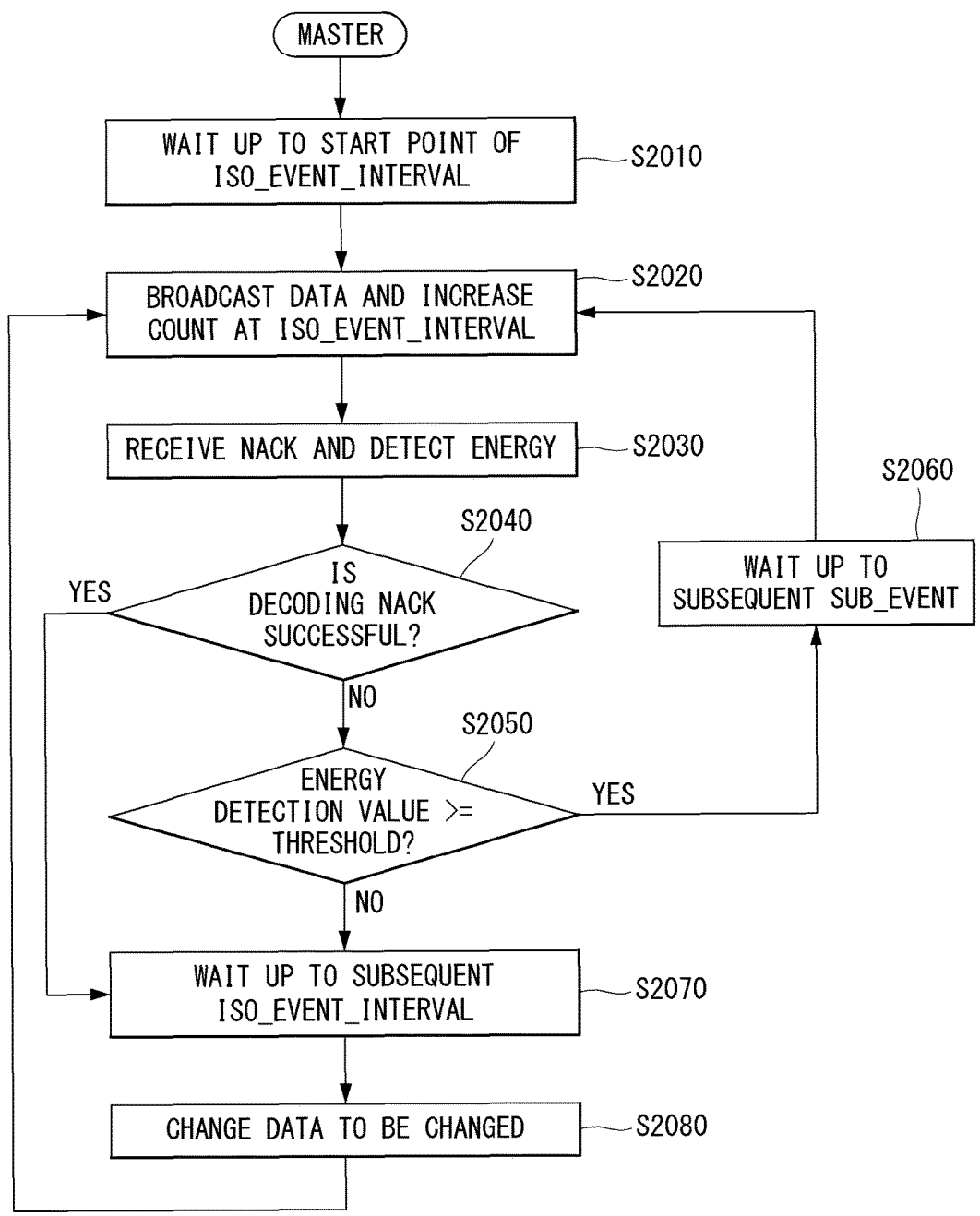

[Figure 21]
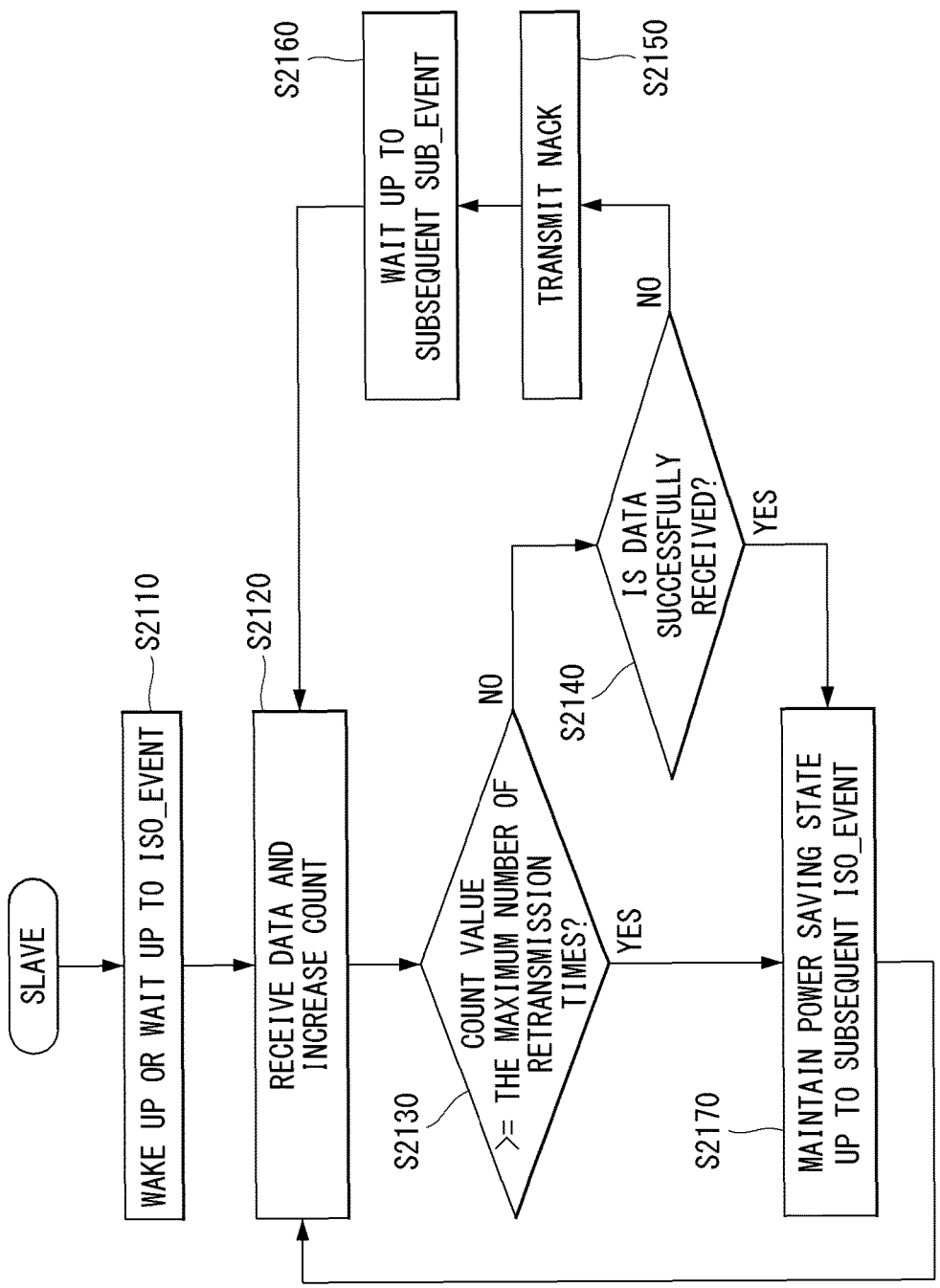

[Figure 22]
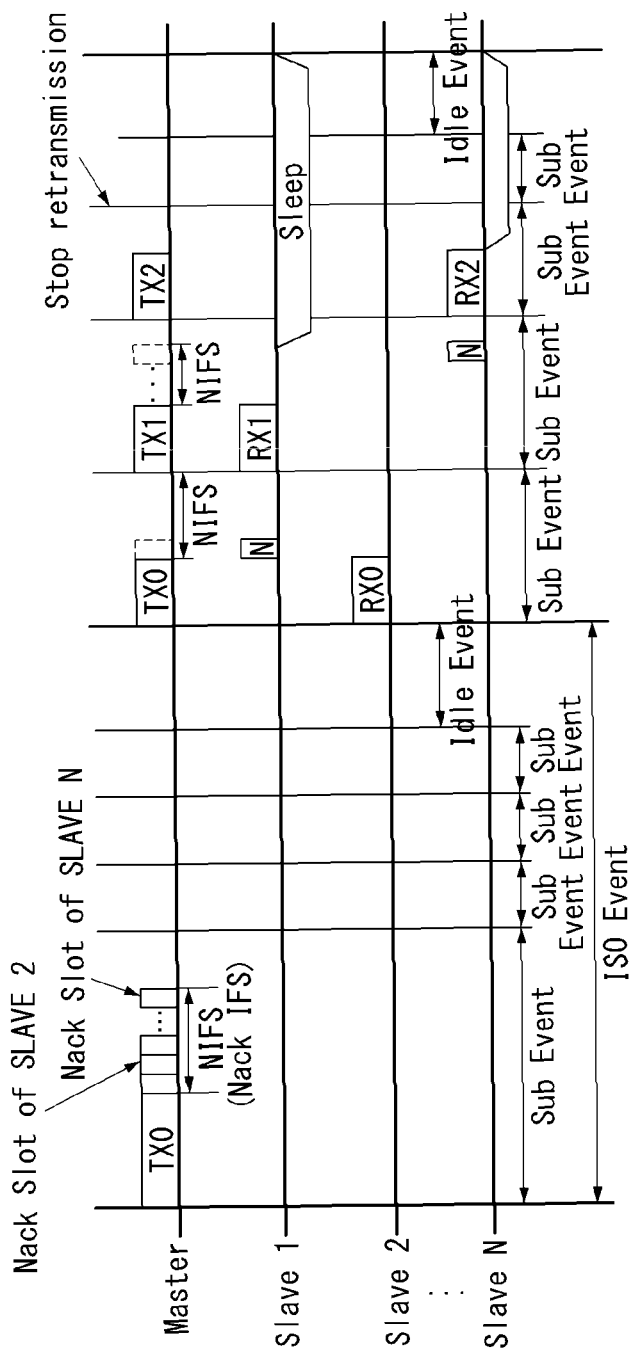

[Figure 23]
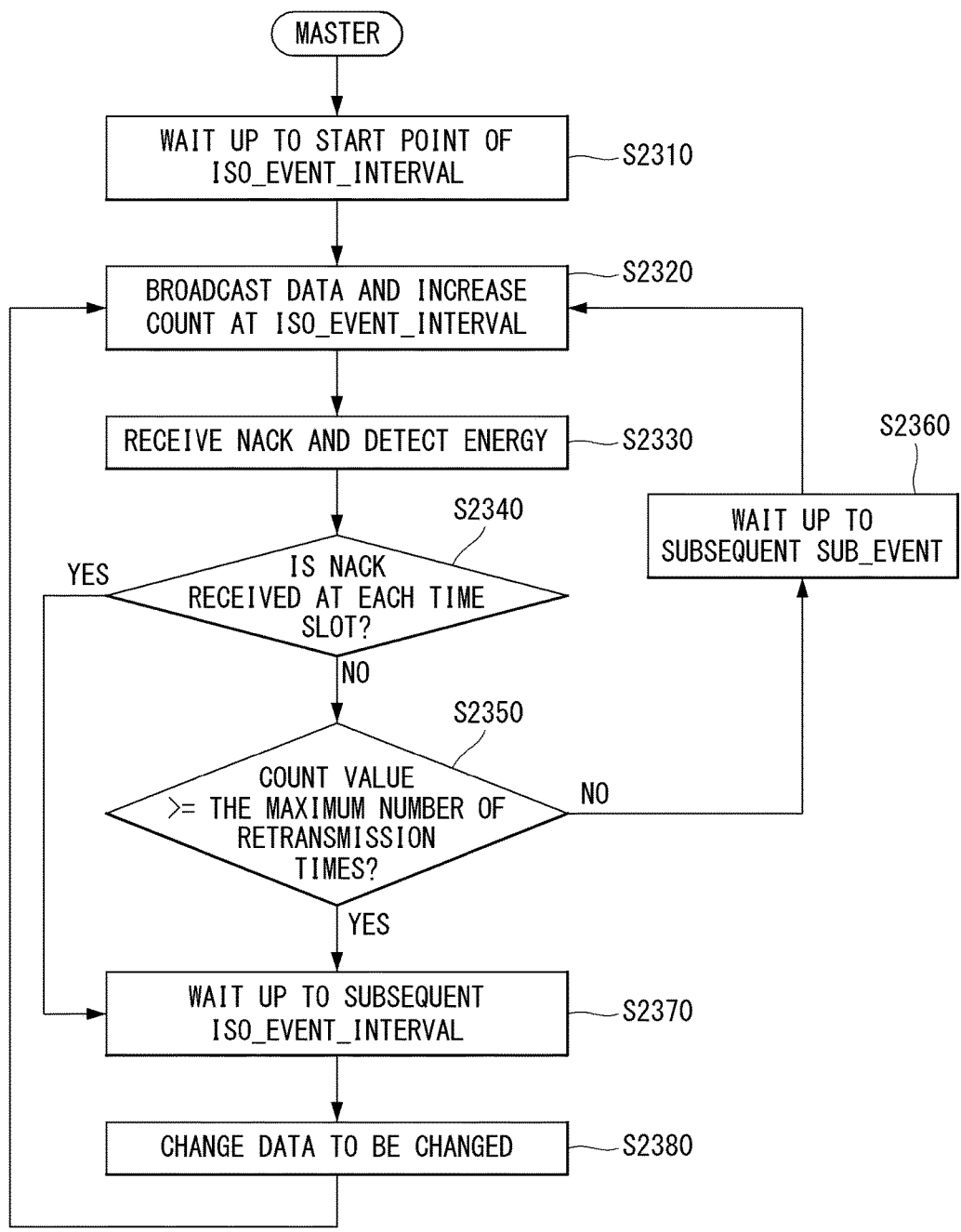

[Figure 24]
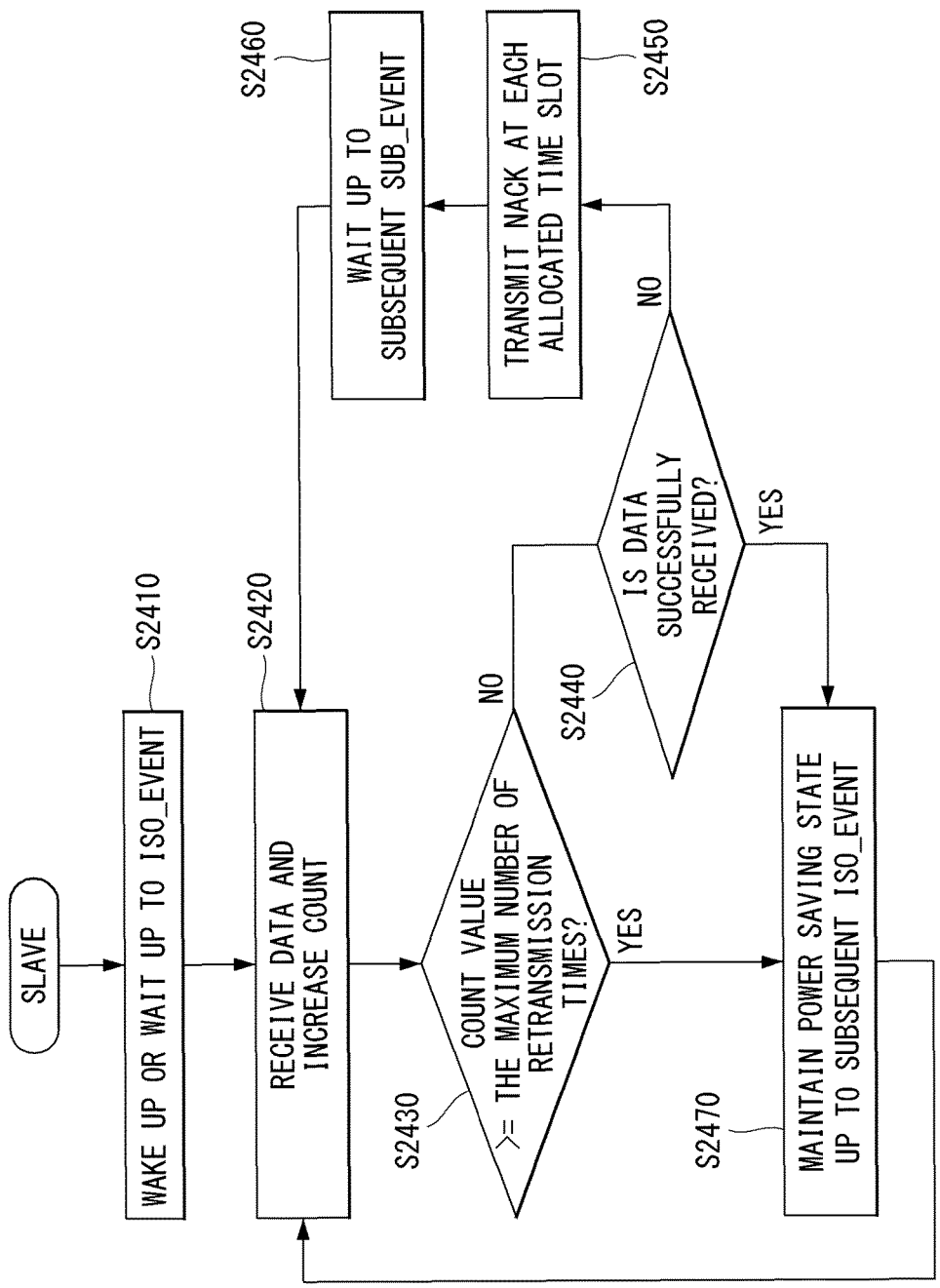

[Figure 25]
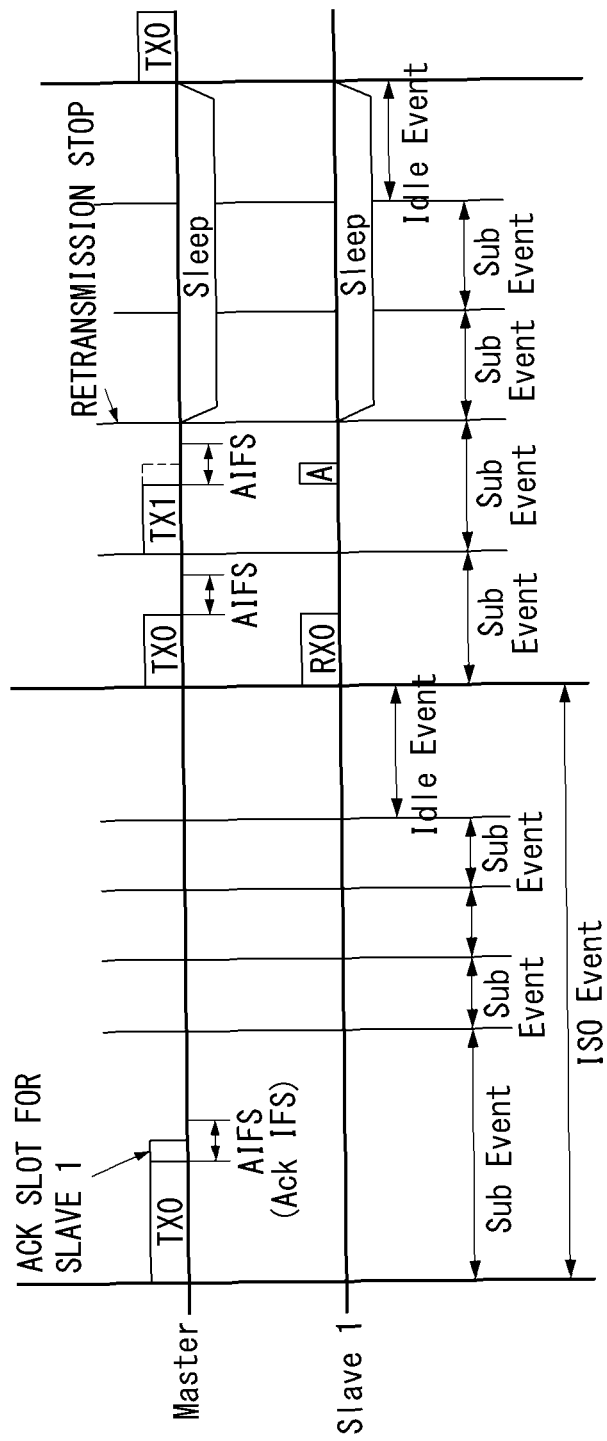

[Figure 26]
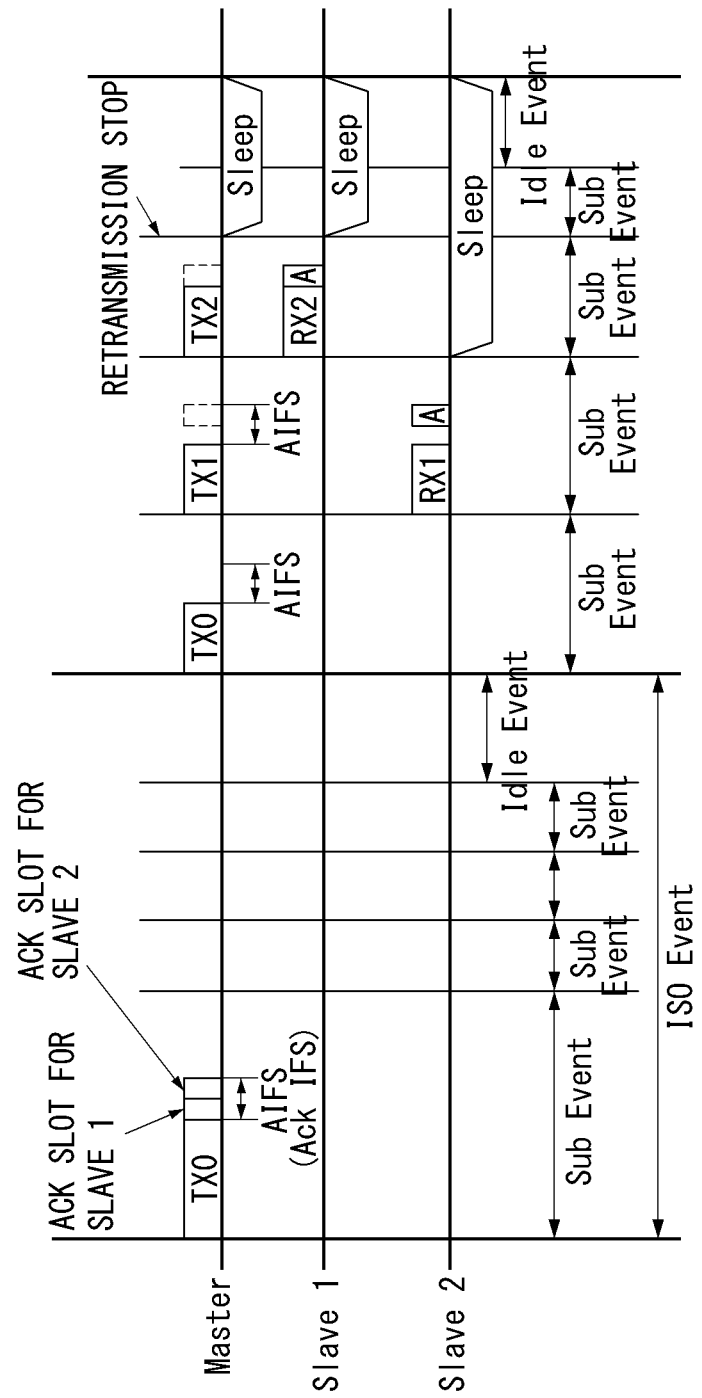

[Figure 27]
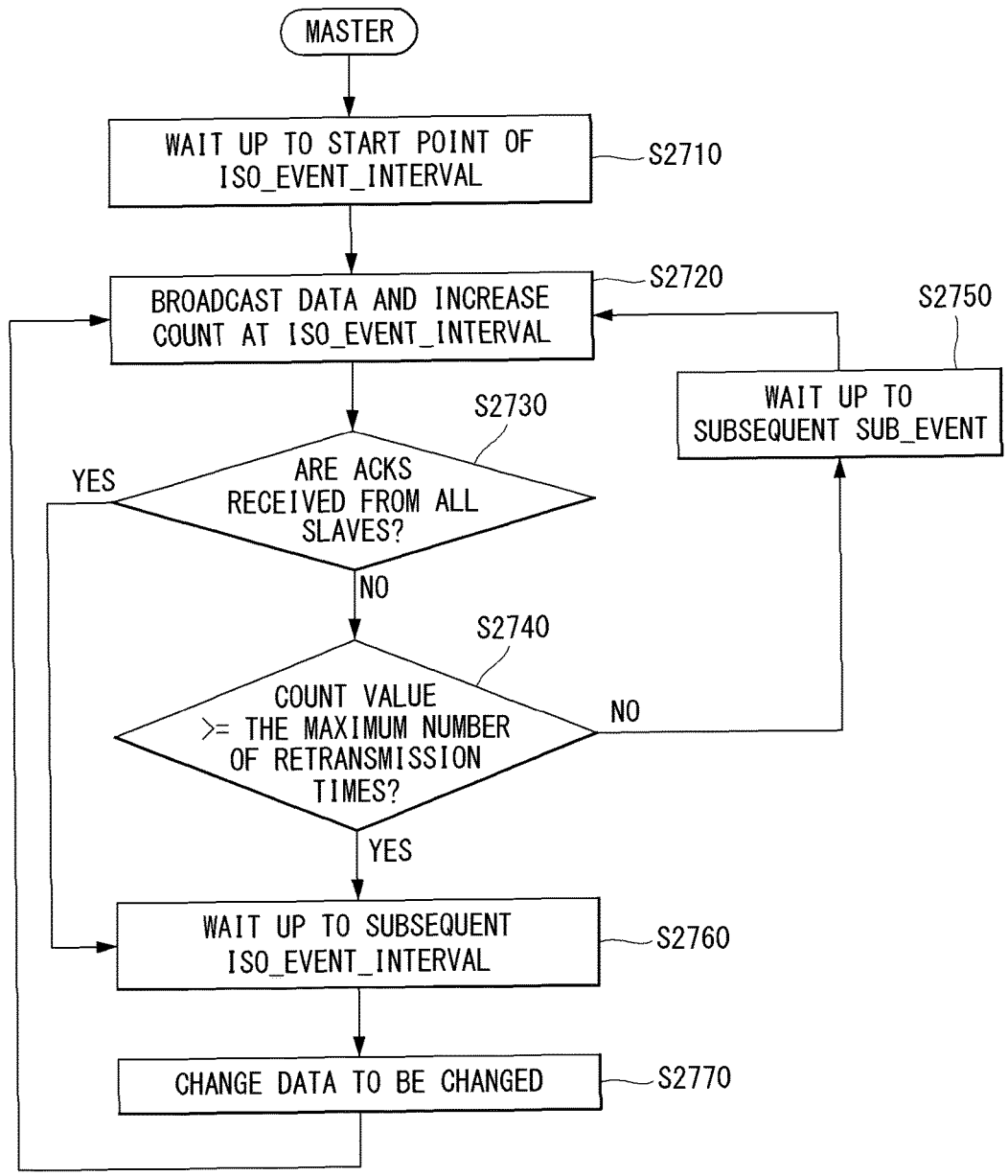

[Figure 28]
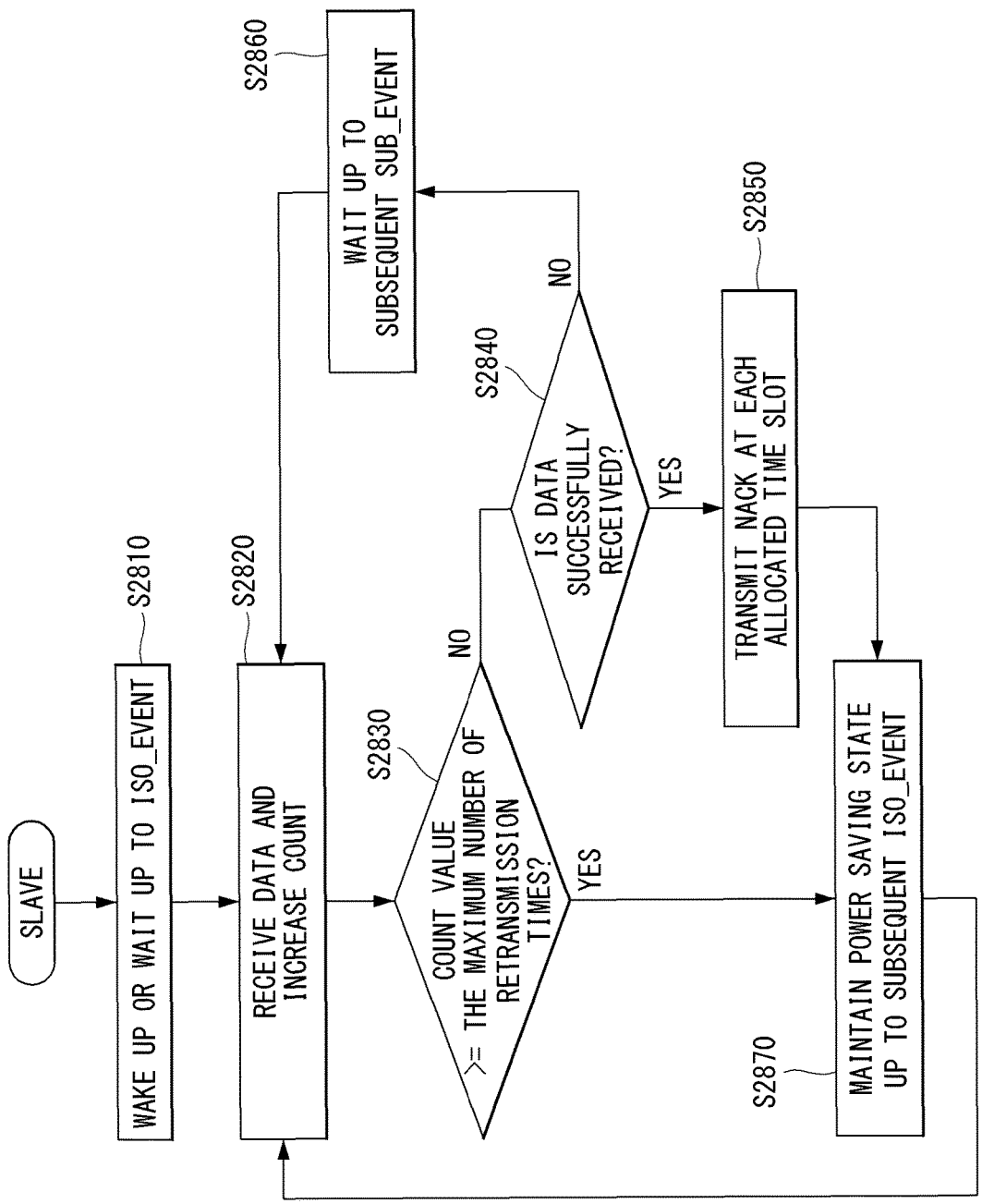

METHOD FOR TRANSMITTING AND RECEIVING AUDIO DATA IN WIRELESS COMMUNICATION SYSTEM SUPPORTING BLUETOOTH COMMUNICATION AND DEVICE THEREFOR

CROSS REFERENCE TO RELATED APPLICATIONS

This application is the National Phase of PCT International Application No. PCT/KR2015/004251, filed on Apr. 28, 2015, which claims priority under 35 U.S.C. 119(e) to U.S. Provisional Application No. 62/020,400, filed on Jul. 3, 2014, all of which are hereby expressly incorporated by reference into the present application.

TECHNICAL FIELD

The present invention relates to a wireless communication system supporting Bluetooth communication, and more particularly, to a method and a device for transmitting/receiving audio data by using Bluetooth low energy in a wireless communication system supporting Bluetooth communication.

BACKGROUND ART

Bluetooth is one of representative short-range wireless technologies that transmit and receive information by connecting various devices (a smart phone, a PC, an earphone, a headphone, and the like). Further, the Bluetooth as a technology that is applied to most of the smart phones, the PCs, notebooks, and the like are easily used by a lot of persons and an easy pairing procedure stably provides connectivity between the devices. An LE technology which has been developed in recent years can stably provide information of hundreds of KB while consuming low power.

A Bluetooth standard technology is divided into basic rate/enhanced data rate (BR/EDR) and low energy (LE) in terms of a core specification.

Among them, Bluetooth low energy (hereinafter, referred to as 'BLE') as a technology which has been represented after Bluetooth Specification V4.0 is contrived for the purpose of high energy efficiency as compared with the existing Bluetooth.

Since the BLE technology is designed to perform a connection procedure only in a situation in which a data transmission request between a master device and a slave device is made, the BLE technology may not be suitable for real-time audio stream transmission in which the data transmission request is periodically made.

That is, when the slave requests data transmission/reception, the BLE master performs a connection within a short time and exchanges required data within a comparative short time and thereafter, performs disconnection.

DISCLOSURE

Technical Problem

Accordingly, an object of the present invention is to newly define an isochronous channel and a mechanism and a mechanism associated therewith for an efficient audio stream by using a Bluetooth LE technology.

An object of the present invention is to provide a repetition based broadcast data transmitting method for increasing transmission reliability through the isochronous channel.

An object of the present invention is to provide a non-acknowledgment (NACK) based broadcast data transmitting method through the isochronous channel.

An object of the present invention is to provide a method which can repeatedly transmit broadcast data through an energy detection process when a collision among NACK transmissions, interference of an external device, and the like occur.

An object of the present invention is to provide a method for allocating a NACK transmission time slot in order to prevent the collision which may occur among the NACK transmissions.

An object of the present invention is to provide a single ACK or dual ACK based unicast transmission method through the isochronous channel.

The technical objects of the present invention are not limited to the aforementioned technical objects, and other technical objects, which are not mentioned above, will be apparently appreciated by a person having ordinary skill in the art from the following description.

Technical Solution

According to the present invention, a method for transceiving audio data by using Bluetooth low energy in a wireless communication system supporting Bluetooth communication by a first device, includes: establishing at least one isochronous channel for transmitting isochronous data with at least one second device; and transmitting the audio data to at least one second device through at least one established isochronous channel during a first interval and the first interval includes at least one second interval in which initial transmissions of the audio data and/or retransmission of the audio data occur or a third interval that operates in a power saving state.

Further, the initial transmission of the audio data may occur at a start point of the first interval.

In addition, the method may further include retransmitting the audio data to at least one second device during at least one second interval.

Moreover, the method may further include: entering the power saving state during the third interval; and terminating the power saving state for transmitting new audio data during a subsequent first interval.

Besides, the audio data may be retransmitted once for each second interval.

Further, when a non-acknowledgement response (NACK) indicating that the audio data is not received from at least one second device is received, the audio data may be retransmitted to at least one second device.

In addition, the method may further include: stopping retransmitting the audio data when the non-acknowledgement response (NACK) indicating that the audio data is not received from at least one second device is not received; and entering the power saving state from the time when the retransmission of the audio data stops.

Moreover, the retransmitting of the audio data may include performing energy detection during at least one second interval when the non-acknowledgement response (NACK) indicating that the audio data is not received from at least one second device is not received, comparing the energy detection result and a predetermined threshold, and retransmitting the audio data to at least one second device during at least one second interval based on the comparison result.

The method may further include allocating to at least one second device a response transmission time slot in which a response associated with whether to receive the audio data may be received from at least one second device.

Further, the response transmission time slot may be allocated for each second device.

The method may further include receiving the response associated with the reception of the audio data from at least one second device through the allocated response transmission time slot.

When an acknowledgement response (ACK) indicating that the audio data is received from at least one second device is not received, the audio data may be retransmitted only to a second device that does not transmit the ACK response.

In addition, the method may further include: stopping retransmitting the audio data when the acknowledgement response (ACK) indicating that the audio data is received from at least one second device is all received; and entering the power saving state from the time when the retransmission of the audio data stops.

Further, the number of one or more second intervals may be determined by the maximum number of retransmission times of the audio data.

Moreover, the allocated response transmission time slot may be positioned next to the audio data transmission interval.

In addition, the audio data may be transmitted through frequency hopping for each second interval.

The may further include: receiving an advertising message from at least one second device; transmitting a scan request message for acquiring additional information to at least one second device; and receiving a scan response message corresponding to a response to the scan request from at least one second device.

Further, the audio data may be transmitted to at least one second device by a broadcast or a unicast method.

In addition, the first device may be a master or a conductor, the second device may be a slave or a member, the first interval may be an isochronous connection interval or an isochronous event interval, and the second interval may be a sub event interval or an isochronous connection interval.

According to the present invention, a first device for transmitting/receiving audio data by using Bluetooth low energy in a wireless communication system supporting Bluetooth communication, includes: a communication unit communicating with an external device by a wireless or wired method; and a processor functionally connected with the communication unit, and the processor controls establishing at least one isochronous channel for transmitting the audio data with at least one second device, and transmitting the audio data to at least one second device through at least one established isochronous channel during a first interval, and the first interval includes at least one second interval in which initial transmissions of the audio data and/or retransmission of the audio data occur or a third interval that operates in a power saving state.

Advantageous Effects

According to the present invention, data which is periodically generated, such as audio data can be efficiently transmitted/received by newly defining an isochronous channel and a mechanism associated therewith.

Further, broadcast data is repeatedly transmitted through the isochronous channel to increase reliability for data transmission.

In addition, the broadcast data can be repeatedly transmitted even though a collision among NACK transmission of slaves, interference of an external device, and the like occur through an energy detection process of a master to increase the reliability for the data transmission.

Moreover, an NACK transmission time slot is allocated to slaves to prevent the collision which can occur among the NACK transmission of the slaves.

Effects which can be obtained in the present invention are not limited to the aforementioned effects and other unmentioned effects will be clearly understood by those skilled in the art from the following description.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

FIG. 1 is a schematic view illustrating one example of a wireless communication system using a Bluetooth low energy technology proposed by the present invention.

FIG. 2 illustrates one example of an internal block diagram of a server device and a client device which can implement methods proposed by the present invention.

FIG. 3 illustrates one example of Bluetooth low energy topology.

FIGS. 4 and 5 are diagrams illustrating one example of a Bluetooth communication architecture to which the methods proposed by the present invention can be applied.

FIG. 6 is a flowchart illustrating one example of a method for providing an object transfer service in a Bluetooth low energy technology.

FIG. 7 is a diagram illustrating a characteristic of an audio signal.

FIG. 8 is a diagram illustrating one example of a home ecosystem for applications in which an isochronous channel can be used, which is proposed by the present invention.

FIG. 9 is a diagram illustrating a use example of the isochronous channel proposed by the present invention.

FIG. 10 is a diagram illustrating one example of an operation state transition procedure in the BLE technology proposed by the present invention.

FIG. 11 is a diagram illustrating various examples of isochronous stream transmission through the isochronous channel proposed by the present invention.

FIGS. 12 and 13 are diagrams illustrating another example of a data transmitting method using an isochronous channel proposed by the present invention.

FIG. 14 is a diagram illustrating examples of an isochronous channel packet format which can be applied to the method proposed by the present invention.

FIG. 15 is a diagram illustrating one example of a basic format of the isochronous channel transmission to which the methods proposed by the present invention can be applied.

FIG. 16 is a diagram illustrating one example of a method for transmitting/receiving data through an isochronous channel proposed by the present invention.

FIG. 17 is a flowchart illustrating one example of an operation method of a master and FIG. 18 is a flowchart illustrating one example of an operation method of a slave in FIG. 16.

FIG. 19 is a diagram illustrating yet another example of a method for transmitting/receiving data through an isochronous channel proposed by the present invention.

FIG. 20 is a flowchart illustrating one example of the operation method of the master in the method of FIG. 19 and FIG. 21 is a flowchart illustrating one example of the operation method of the slave in the method of FIG. 19.

FIG. 22 is a diagram illustrating yet another example of a method for transmitting/receiving data through an isochronous channel proposed by the present invention.

FIG. 23 is a flowchart illustrating one example of the operation method of the master in the method of FIG. 22 and FIG. 24 is a flowchart illustrating one example of the operation method of the slave in the method of FIG. 22.

FIG. 25 is a diagram illustrating yet another example of a method for transmitting/receiving data through an isochronous channel proposed by the present invention.

FIG. 26 is a diagram illustrating yet another example of a method for transmitting/receiving data through an isochronous channel proposed by the present invention.

FIG. 27 is a flowchart illustrating one example of the operation method of the master in the method of FIG. 26 and FIG. 28 is a flowchart illustrating one example of the operation method of the slave in the method of FIG. 26.

BEST MODE

In what follows, the present invention will be described in more detail with reference to appended drawings.

A suffix such as "module" and "unit" introduced in the description below is assigned merely to facilitate description of this document, and the "module" and "unit" can be used interchangeably.

Meanwhile, a device according to this document refers to a device capable of wireless communication, including a mobile phone including a smartphone, tablet PC, desktop computer, notebook, and television including a smart TV and IPTV.

In what follows, embodiments of the present invention will be described in detail with reference to appended drawings and descriptions contained in the drawings, but the technical scope of the present invention is not restricted by the embodiments or limited to the embodiments.

Wherever possible, general terms widely used by the public have been chosen as long as the terms do not obscure their technical functions intended in the present invention; however, those terms can be changed by the intention of those skilled in the art, practices, or advent of a new technology.

In some case, specific terms are chosen arbitrarily; in that case, specific meaning of the corresponding terms will be elaborated at the corresponding description.

Therefore, the terms used in this document should be interpreted on the basis of their actual meaning and the description throughout the document rather than the immediate names of the terms.

FIG. 1 illustrates one example of a wireless communication system using a Bluetooth low energy technology to which a method according to the present invention can be applied.

The wireless communication system 1 comprises at least one server device 110 and at least one client device 120.

The server device and the client device perform Bluetooth communication by using Bluetooth Low Energy (in what follows, it is denoted as BLE for the purpose of convenience) technology.

First of all, compared with Bluetooth BR/EDR (Basic Rate/Enhanced Data Rate) technology, BLE technology requires a relatively small duty cycle. Products based on BLE technology can be manufactured at low costs and require considerably small power consumption through low speed data transmission rate; therefore, they can be operated more than one year with a coin cell battery.

Also, BLE technology simplifies a connection procedure between devices and requires a smaller packet size than Bluetooth BR/EDR technology.

Features of BLE technology can be summarized as follows: (1) the number of RF channels is 40, (2) the data transmission speed of 1 Mbps is supported, (3) star topology is used, (4) latency is 3 ms, (5) the maximum current is less than 15 mA, (6) the output power is less than 10 mW (10 dBm), and (7) main application fields include mobile phones, watch, sports, health-care, sensor, and device control.

The server device 110 can operate as a client device in a relationship with a different device, and similarly the client device can operate as a server device in a relationship with a different device. In other words, in the BLE communication system, a device can operate as a server device or a client device, and if needed, a device can operate as a server device and a client device at the same time.

The server device 110 can be called a data service device, master device, master, server, conductor, host device, audio source device, or first device. The client device can be called a slave device, slave, client, member, sink device, audio sink device, or second device.

The server device and the client device constitute a main part of the wireless communication system, and the wireless communication system can include other constituting elements in addition to the server device and the client device.

The server device refers to a device which receives data from a client, performs communication directly with the client device, and if receiving a data request from the client device, provides data to the client device through a response.

Also, the server device sends a notification message and indication message to the client device to provide data information to the client device. Also, when transmitting an indication message to the client device, the server device receives a confirm message corresponding to the indication message from the client device.

Also, the server device can provide data information to the user through a display unit or receive a request input from the user through a user input interface while transmitting and receiving a notification, indication, and confirm message to and from the client device.

Also, the server device can read data from a memory unit or write new data to the corresponding memory while transmitting and receiving a message to and from the client device.

Also, one server device can be connected to a plurality of client devices and can be easily re-connected to client devices by using bonding information.

The client device 120 refers to a device which requests data information and data transmission from a server device.

The client device receives data from the server device through a notification message and indication message and when receiving an indication message from the server device, sends a confirm message in response to the indication message.

In the same way as the server device, the client device can provide information to the user through a display unit or receive an input from the user through a user input interface while transmitting and receiving message to and from the server device.

Also, the client device can read data from a memory unit or write new data to the corresponding memory while transmitting and receiving a message to and from the server device.

Hardware components such as a display unit, user input interface, and memory unit of the server device and the client device will be described in detail with reference to FIG. 2.

Also, the wireless communication system can form a Personal Area Network (PAN) by using Bluetooth technology. As one example, the wireless communication system can exchange files and documents in a prompt and safe manner by forming a private piconet among devices.

A BLE device can operate to support various Bluetooth-related protocols, profiles, and processes.

FIG. 2 illustrates one example of an internal block diagram of a server device and a client device capable of implementing methods of the present invention.

A server device can be connected to at least one client device.

Also, depending on the needs, the internal block diagram of each device may further include other constituting elements (modules, blocks, or units), and part of the constituting elements of FIG. 2 may be omitted.

As shown in FIG. 2, a server device comprises a display unit 111, a user input interface 112, a power supply unit 113, a processor 114, a memory unit 115, a Bluetooth interface 116, other interface 117, and a communication unit (or transmitting and receiving unit) 118.

The display unit 111, user input interface 112, power supply unit 113, processor 114, memory unit 115, Bluetooth interface 116, other interface 117, and communication unit 118 are functionally connected to each other to perform a method of the present invention.

Also, a client device comprises a display unit 121, a user input interface 122, a power supply unit 123, a processor 124, a memory unit 125, a Bluetooth interface 126, and a communication unit (or transmitting and receiving unit) 127.

The display unit 121, user input interface 122, power supply unit 123, processor 124, memory unit 125, Bluetooth interface 126, and communication unit 127 are functionally connected to each other to perform a method of the present invention.

The Bluetooth interface 116, 126 refers to a unit (or module) capable of transmitting a request/response, command, notification, indication/confirm message, or data between devices by using Bluetooth technology.

The memory 115, 125 is a unit implemented in various types of devices and refers to a unit to which various types of data are stored.

The processor 114, 124 refers to a module controlling the overall operation of the server device or the client device; and controls the server device or the client device to request transmission of a message through the Bluetooth interface or other interface and to process a received message.

The processor 114, 124 can be represented by a controller or a control unit.

The processor 114, 124 can include Application-Specific Integrated Circuit (ASIC), other chipsets, logical circuit and/or data processing device.

The memory 115, 125 can include ROM (Read-Only Memory), RAM (Random Access Memory), flash memory, memory card, storage medium and/or other storage device.

The communication unit 118, 127 can include baseband circuit for processing a radio signal. In case an embodiment is implemented in the form of software, the method described above can be implemented by a module (process or function) which performs the function described above. A module is stored in the memory and is carried out by the processor.

The memory 115, 125 can be installed inside or outside the processor 114, 124 and can be connected to the processor 114, 124 through various well-known means.

The display unit 111, 121 refers to the module for providing status information of a device and message exchange information to the user through a display.

The power supply unit 113, 123 refers to the module receiving external or internal power under the control of the controller and supplying power required for the operation of each individual element.

As described above, BLE technology is characterized by a small duty cycle and considerably reduces power consumption through a low data transmission rate; therefore, BLE technology is capable of supplying power required for the operation of each individual element even with small output power (which is less than 10 mW (10 dBm)).

The user input interface 112, 122 refers to the module which provides a user input such as a display button to the controller so that the user can control the operation of a device.

FIG. 3 illustrates one example of a Bluetooth low energy network topology.

With reference to FIG. 3, a device A corresponds to a piconet (piconet A, the shaded area) master having a device B and a device C as slaves.

At this time, a piconet refers to a set of devices where one from among a plurality of devices acts as a master and the others occupy a shared physical channel connected to the master device.

A BLE slave does not share the common physical channel with the master. Each slave communicates with the master through a separate physical channel. There is another piconet (piconet F) which consists of a master device F and a slave device G.

A device K belongs to a scatternet K. At this time, a scatternet refers to a group of piconets interconnected to each other.

A device K is a master of a device L and at the same time, a slave of a device M.

A device O also belongs to a scatternet O. The device O is a slave of a device P and at the same time, a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In group D, the device D advertises by using an advertisement event which can be connected on an advertising physical channel, and the device A is an initiator. The device A can establish a connection to the device D and add a device to the piconet A.

In group C, the device C advertises on an advertising physical channel by using a certain type of an advertisement event captured by the scanner device E.

The group D and the group C can utilize different advertising physical channels or different time frames to avoid collision.

The piconet F has one physical channel. The device F and the device G use one BLE piconet physical channel. The device F is a master, and the device G is a slave.

The group H has one physical channel. The device H, I, and J use one BLE advertising physical channel. The device H is an advertiser, and the device I and J are scanners.

In the scatternet K, the device K and L use one BLE piconet physical channel. The device K and M use another BLE piconet physical channel.

In group K, the device K advertises by using an advertisement event which can be connected to an advertising physical channel, and the device N is an initiator. The device N can establish a connection with the device K. At this time, the device K acts as a slave of two devices, and at the same time, a master of one device.

In the scatternet O, the device O and P use one BLE piconet physical channel. The device O and Q use another BLE piconet physical channel.

In group R, the device R advertises by using an advertisement event which can be connected to an advertising physical channel, and the device O is an initiator. The device O can establish a connection with the device R. At this time, the device O acts as a slave of two devices, and at the same time, a master of one device.

FIGS. 4 and 5 illustrate one example of Bluetooth communication architecture to which methods according to the present invention can be applied.

More specifically, FIG. 4 illustrates one example of Bluetooth BR (Basic Rate)/EDR (Enhanced Data Rate), and FIG. 5 illustrates one example of Bluetooth LE (Low Energy) architecture.

First, as shown in FIG. 4, Bluetooth BR/EDR architecture comprises a controller stack 410, HCI (Host Controller Interface) 420, and a host stack 430.

The controller stack (or controller module, 410) refers to the hardware for transmitting or receiving Bluetooth packets to and from a wireless transmission and reception module dealing with Bluetooth signals of 2.4 GHz; and comprises a BR/EDR Radio layer 411, BR/EDR Baseband layer 412, and BR/EDR Link Manager layer 413.

The BR/EDR Radio layer 411 transmits and receives a radio signal of 2.4 GHz and is capable of transmitting data by hopping 79 RF channels when Gaussian Frequency Shift Keying (GFSK) modulation is employed.

The BR/EDR baseband layer 412 transmits a digital signal, selects a channel sequence which performs hopping 1600 times per second, and transmits a time slot spanning 625 us for each channel.

The link manager layer 413 controls the overall operation of a Bluetooth connection such as link setup, control, and security by using Link Manager Protocol (LMP).

The link manager layer can perform the following functions.
  Control of ACL/SCO logical transport and logical link setup
  Detach: removes a connection and informs the corresponding device of the cause of the removal.
  Performs power control and role switch
  Performs a security function such as authentication, pairing, and encryption.

The host controller interface layer 420 provides an interface between a host module 430 and a controller module 410 so that a host can provide a command and data to a controller and the controller can provide an event and data to the host.

The host stack (or host module) 430 comprises L2CAP 437, Service Discovery Protocol (SDP) 433, BR/EDR protocol 432, BR/EDR profiles 431, Attribute Protocol 436, Generic Access Profile (GAP) 434, and Generic Attribute Profile (GATT) 435.

The Logical Link Control and Adaptation Protocol (L2CAP) 437 provides one bilateral channel for transmitting data according to a specific protocol or with a specific profile.

The L2CAP multiplexes various protocols and profiles provided by Bluetooth upper layers.

The L2CAP of the Bluetooth BR/EDR specification uses a dynamic channel; supports a protocol service multiplexer, retransmission, and streaming mode; and provides segmentation and reassembly, per-channel flow control, and error control.

The Service Discovery Protocol (SDP) 433 refers to the protocol used to search for a service (profile and protocol) that a Bluetooth service supports.

The BR/EDR protocols and profiles 432, 431 define a service employing the Bluetooth BR/EDR specification and an application protocol according to which exchange of data is performed.

The Attribute Protocol 436 relies on a server-client structure, which defines rules for the corresponding device to access data. Six message types are defined as shown below: Request message, Response message, Command message, Notification message, and Indication message.
  Request message from client to server with Response message from server to client
  Command message from client to server without Response message
  Notification message from server to client without Confirm message
  Indication message from server to client with Confirm message from client to server The Generic Attribute Profile (GATT) 435 defines an attribute type.

The Generic Access Profile (GAP), 434 defines a method for discovering and connecting a device; and a method for providing information to a user. The GAP provides a privacy scheme.

As shown in FIG. 5, the BLE structure comprises a controller stack capable of processing a wireless device interface for which timing is critical and a host stack capable of processing high level data.

The controller stack may be called a controller, but in order to avoid being confused with the processor which is an internal element of a device described earlier in FIG. 2, the name of the controller stack is preferred in what follows.

First, the controller stack can be implemented by using a communication module which can include a Bluetooth wireless device and a processor module which can include a processing device such as a microprocessor.

The host stack can be implemented as part of the OS operating on the processor module or as a package instance on the OS.

In some cases, the controller stack and the host stack can be operated or carried out on the same processing device within the processor module.

The host stack comprises Generic Access Profile (GAP) 510, GATT based Profiles 520, Generic Attribute Profile (GATT) 530, Attribute Protocol (ATT) 540, Security Manager (SM) 550, and Logical Link Control and Adaptation Protocol (L2CAP) 560. The host stack is not limited to the aforementioned composition, but can include various protocols and profiles.

By using the L2CAP, the host stack multiplexes various protocols and profiles that Bluetooth specification provides.

First, the L2CAP 560 provides one bilateral channel for transmitting data to according to a specific protocol or with a specific profile.

The L2CAP is capable of multiplexing data among upper layer protocols, segmenting or reassembling packages, and managing multicast data transmission.

BLE uses three fixed channels: one for signaling, another for the security manager, and the third for the attribute protocol.

On the other hand, BR/EDR (Basic Rate/Enhanced Data Rate) uses a dynamic channel and supports protocol service multiplexer, retransmission, streaming mode.

The Security Manager (SM) 550 authenticates a device, which is a protocol for providing key distribution.

The Attribute Protocol (ATT) 540 relies on a server-client structure, which defines rules for the corresponding device to access data. Six message types are defined: Request, Response, Command, Notification, Indication, and Confirmation.

Request and Response message: Request message is used when a client device requests specific information from a server device, and Response message is used in response to the Request message, which is transmitted from the server device to the client device.

Command message: It is transmitted from the client device to the server device to indicate a command for specific operation, but the server device does not transmit a response to the Command message to the client device.

Notification message: The server device transmits this message to the client device to notify of an event, but the client device does not transmit a confirmation message with respect to the Notification message to the server.

Indication and Confirm message: the server device transmits this message to the client device to notify of an event. Different from the Notification message, the client device transmits a Confirm message with respect to the Indication message to the server device.

The Generic Access Profile (GAP) is the layer newly implemented to support BLE technology and is used to control selection of roles for communication among BLE devices and the procedure of multi-profile operation.

The GAP is used mainly for device discovery, connection establishment, and security; defines a method for providing information to a user; and defines the following attribute types.

Service: a combination of behaviors related to data. Defines basic operation of a device.

Include: defines a relationship between services.

Characteristics: a data value used by a service

Behavior: a format that can be readable by a computer, which is defined by Universal Unique Identifier (UUID) and a value type.

GATT-based profiles are dependent on the GATT and are applied mainly for BLE devices. The GATT-based profiles may include Battery, Time, FindMe, Proximity, Object Delivery Service, and so on. More specific descriptions of the GATT-based profiles are as follows.

Battery: method for exchanging battery information.

Time: method for exchanging time information.

FindMe: provides an alarm service according to a distance.

Proximity: method for exchanging battery information.

The GATT can be used as a protocol by which to describe how ATT is utilized at the time of composing services. For example, the GATT can be used to define how ATT profiles are grouped together with services and to describe characteristics associated with the services.

Therefore, GATT and ATT describe device states and services; and how features are associated with each other and how they are used.

The controller stack comprises a physical layer 590, link layer 580, and host controller interface 570.

The physical layer (wireless transmission and reception module 590) transmits and receives a radio signal of 2.4 GHz; and uses Gaussian Frequency Shift Keying (GFSK) modulation and frequency hopping utilizing 40 RF channels.

The link layer 580 transmits or receives Bluetooth packets.

Also, the link layer establishes a connection between devices after performing the advertising and scanning function by using three advertising channels; and provides a function of exchanging a maximum of 42 bytes of data packets through 37 data channels.

The Host Controller Interface (HCI) provides an interface between the host stack and the controller stack so that the host stack can provides commands and data to the controller stack and the controller stack can provide events and data to the host stack.

In what follows, the procedure of Bluetooth Low Energy (BLE) will be described briefly.

The BLE procedure comprises a device filtering procedure, advertising procedure, scanning procedure, discovering procedure, and connecting procedure.

Device Filtering Procedure

The device filtering procedure is intended to reduce the number of devices performing a response to a request, command, or notification in the controller stack.

It is not necessarily required for all of the devices to respond to a received request; therefore, the controller stack reduces the number of transmitted requests so that power consumption can be reduced in the BLE controller stack.

An advertising device or a scanning device can perform the device filtering procedure to restrict devices which receive advertisement packets, scan request, or connection request.

At this time, an advertising device refers to a device which transmits an advertisement event, namely a device which performs advertisement and is also called an advertiser.

A scanning device refers to a device which performs scanning, namely a device which transmits a scan request.

In the BLE specification, if a scanning device receives part of advertisement packets from an advertising device, the scanning device has to transmit a scan request to the advertising device.

However, in case transmission of a scan request is not required as the device filtering procedure is employed, the scanning device can ignore advertisement packets transmitted from an advertising device.

The device filtering procedure can be used even in the connection request procedure. If device filtering is used for the connection request procedure, the need for transmitting a response to a connection request can be made unnecessary by ignoring the connection request.

Advertising Procedure

An advertising device performs an advertisement procedure to perform non-directional broadcast by using the devices within the range of the advertising device.

At this time, non-directional broadcast refers to the broadcast in all directions rather than the broadcast in specific directions.

Different from the non-directional broadcast, directional broadcast refers to the broadcast in a specific direction. Non-directional broadcast is performed without involving a connection procedure between devices in a listening state (in what follows, they are called listening devices).

The advertising procedure is used to establish a Bluetooth connection to a nearby initiating device.

Or the advertising procedure can be used to provide periodic broadcast of user data to the scanning devices performing listening through an advertising channel.

In the advertising procedure, all of the advertisement (or advertisement events) are broadcast through an advertising physical channel.

Advertising devices can receive scan requests from listening devices performing the listening operation to obtain additional user data from advertising devices. An advertising device transmits a response with respect to the scan request to the device which has transmitted the scan request through the same advertising physical channel through which the advertising device has received the scan request.

While the broadcast user data sent as part of advertising packets form dynamic data, the scan response data are static for the most part.

An advertising device can receive a connection request from an initiating device on the advertising (broadcast) physical channel. If the advertising device has used a connectable advertisement event and the initiating device has not been filtered by the filtering procedure, the advertising device stops advertisement and enters a connected mode. The advertising device can resume advertisement after entering the connected mode.

Scanning Procedure

A device performing scan operation, namely a scanning device performs a scanning procedure to listen to non-directional broadcast of user data from advertising devices which use an advertising physical channel.

To request additional user data, the scanning device transmits a scan request to an advertising device through the advertising physical channel. The advertising device transmits a scan response with respect to the scan request through the advertising physical channel by including additional user data that the scanning device has requested.

The scanning procedure can be used while the scanning device is being connected to another BLE device in a BLE piconet.

If the scanning device receives a broadcast advertising event and stays in an initiator mode where a connection request can be initiated, the scanning device can initiate a Bluetooth connection to an advertising device by sending a connection request to the advertising device through the advertising physical channel.

If the scanning device transmits a connection request to the advertising device, the scanning device stops all the scanning for additional broadcast and enters the connected mode.

Discovering Procedure

Devices capable of Bluetooth communication (in what follows, they are called 'Bluetooth devices') perform the advertising procedure and the scanning procedure to discover devices in the surroundings of the devices or to be discovered by other devices within a given area.

The discovering procedure is performed in an asymmetric manner. A Bluetooth device searching for another Bluetooth device in the surroundings is called a discovering device and performs listening to search for devices advertising an advertisement event that can be scanned. A Bluetooth device that can be found and used by another device is called a discoverable device, and the discoverable device actively broadcasts an advertisement event so that other devices can scan the discoverable device through an advertising (broadcast) physical channel.

Both of the discovering device and the discoverable device may be already connected to other Bluetooth devices in a piconet.

Connecting Procedure

The connecting procedure is asymmetric. In the connecting procedure, while a particular Bluetooth device is performing the advertising procedure, other Bluetooth devices are required to perform the scanning procedure.

In other words, the advertising procedure can be a primary task to be performed, and as a result, only one device will respond to the advertisement. After receiving a connectable advertisement event from an advertising device, the connecting procedure can be initiated by sending a connection request to the advertising device through the advertising (broadcast) physical channel.

Next, operation states defined in the BLE technology, namely advertising state, scanning state, initiating state, and connection state will be described briefly.

Advertising State

The link layer (LL) enters the advertising state by the command of the host (stack). In case the link layer is in the advertising state, the link layer transmits advertising Packet Data Units (PDUs) from advertisement events.

Each advertisement event comprises at least one advertising PDU, and advertising PDUs are transmitted through advertising channel indices used. Each advertisement event can be closed earlier in case advertising PDUs are transmitted through the respective advertising channel indices, the advertising PDUs are terminated, or the advertising device needs to secure space to perform other functions.

Scanning State

The link layer enters the scanning state by the command of the host (stack). In the scanning state, the link layer listens to advertising channel indices.

The scanning state supports two types: passive and active scanning. The host determines scanning type.

No separate time or advertising channel index is defined to perform scanning.

While in the scanning state, the link layer listens to the advertising channel index for the duration of scanWindow. A scanInterval is defined as an interval between start points of two consecutive scan windows.

When there is no scheduling collision, the link layer has to perform listening to complete all of the scanIntervals of scanWindows as commanded by the host. In each scan Window, the link layer has to scan other advertising channel indices. The link layer uses all of the advertising channel indices available.

In the case of passive scanning, the link layer is unable to transmit any packet but only receives packets.

In the case of active scanning, the link layer performs listening to the advertising device to rely on the advertising PDU type by which additional information related to the advertising PDUs and advertising device can be requested.

Initiating State

The link layer enters the initiating state by the command of the host (stack).

While in the initiating state, the link layer performs listening to the advertising channel indices.

While in the initiating state, the link layer listens to the advertising channel index for the duration of scanWindow.

Connection State

The link layer enters the connection state when a device performing a connection request, namely the initiating device transmits the CONNECT_REQ PDU to an advertising device or the advertising device receives the CONNECT_REQ PDU from the initiating device.

Establishing a connection is taken into account after the link layer enters the connection state. However, there is no need to take into account establishing a connection at the time the link layer enters the connection state. The only difference between a newly created connection and a pre-existing connection is a supervision timeout value for link layer connection.

When two devices are connected to each other, the two devices perform the respective roles different from each other.

The link layer performing the role of the master is called a master, while the link layer performing the role of the slave is called a slave. The master adjusts the timing of a connection event, where the connection event denotes the time at which the mast and the slave are synchronized with each other.

A master (central) is such a device that periodically scans a connectable advertising signal to establish a connection to other device (slave, peripheral) and requests an appropriate device to establish a connection.

Also, once connected to a slave device, the master device sets up timing and supervises periodic data exchange.

At this time, the timing can be a hopping rule applied to two device to exchange data each time through the same channel.

A slave (peripheral) is such a device that periodically transmits a connectable advertising signal to establish a connection with other device (master).

Therefore, if a master device which has received the connectable advertising signal sends a connection request, the slave device accepts the request and establishes a connection with the master device.

After the slave device establishes a connection with the master device, the slave device exchanges data periodically by hopping a channel according to the timing specified by the master device.

In what follows, the packet defined in the Bluetooth interface will be described briefly. BLE devices use the packets described below.

Packet Format

The link layer has only one packet format used for both of the advertising channel packet and data channel packet.

Each packet comprises four fields: a preamble, access address, PDU, and CRC.

When one packet is transmitted from the advertising physical channel, the PDU will function as an advertising channel PDU; when one packet is transmitted from the data physical channel, the PDU will function as a data channel PDU.

Advertising Channel PDU

The advertising channel PDU comprises a 16 bit header and a payload of various size.

The PDU type filed of the advertising channel included in the header supports PDU types as defined in Table 1 below.

TABLE 1

| PDU Type | PACKet Name |
| --- | --- |
| 0000 | ADV-IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: connectable non-directional advertisement event

ADV_DIREC_IND: connectable directional advertisement event

ADV_NONCONN_IND: non-connectable non-directional advertisement event

ADV_SCAN_IND: non-directional advertisement event that can be scanned

The PDUs are transmitted from the link layer in the advertising state and are received by the link layer in the scanning state or initiating state.

Scanning PDUs

The advertising channel PDU type below is called a scanning PDU and is used in such a state described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU comprises a 16 bit header and a payload of various size; and can include a Message Integrity Check (MIC) field.

The procedures, states, and packet formats of the BLE technology descried above can be applied to perform the methods according to the present invention.

FIG. 6 is a flowchart illustrating one example of a method for providing an object transfer service in a Bluetooth low energy technology.

The object delivery service or object transfer service represents a service which is supported in BLE in order to transmit or receive an object or data such as bulk data in the Bluetooth communication.

An advertisement process and a scanning process corresponding to steps S610 to S630 are performed for a Bluetooth connection configuration between the server device and the client device.

First, the server device transmits an advertisement message to the client server in order to announce information associated with the server device including the object transfer service (S610).

The advertisement message may be expressed by a packet data unit (PDU), an advertisement packet, an advertisement, an advertisement frame, an advertisement physical channel PDU, and the like.

The advertisement message may include service information (including a service name), a name of the server device, manufacturer data, and the like provided by the server device.

Further, the advertisement message may be transmitted to the client device by a broadcast method or a unicast method.

Therefore, the client device transmits a scan request message to the server device in order to find more detailed information associated with the server device (S620).

The scan request message may be expressed by a scanning PDU, a scan request PDU, a scan request, a scan request frame, a scan request packet, and the like.

Thereafter, the server device transmits a scan response message to the client device as a response to the scan request message received from the client device (S630).

The scan response message includes server device associated information requested by the client device. Herein, the server device associated information may be an object or data which may be transmitted by the server device in association with providing the object transfer service.

When the advertisement process and the scanning process end, the server device and the client device perform an initiating connection process and a data exchange process corresponding to steps S640 to S670.

In detail, the client device transmits a connect request message to the server device for Bluetooth communication connection with the server device (S640).

The connect request message may be expressed by a connect request PDU, an initiation PDU, a connect request frame, a connect request, and the like.

Through step S640, the Bluetooth connection is established between the server device and the client device and thereafter, the server device and the client device exchange data. During the data exchange process, the data may be transmitted/received through a data channel PDU.

The client device transmits an object data request to the server device through a data channel PDU (S650). The data channel PDU may be expressed by a data request message, a data request frame, and the like.

Thereafter, the server device transmits the object data requested by the client device to the client device through the data channel PDU (S660).

Herein, the data channel PDU is used for providing data to a counterpart device or request data information by a method defined by an attribute protocol.

Thereafter, when the data is changed in the server device, the server device transmits data changed indication information to the client device through the data channel PDU in order for the server device to announce the change in data or object (S670).

Thereafter, the client device requests the changed object information to the server device in order to find the changed data or the change object (S680).

Thereafter, the server device transmits the object information changed in the server device to the client device as a response to the changed object information request (S690).

Thereafter, the client device finds the changed object through comparison and analysis of the received changed object information and the object information currently possessed by the client device.

However, the client device repeatedly performs steps S680 to S690 until finding the changed object or data.

Therefore, when a connection state between the host device and the client device need not be maintained, the host device or the client device may disconnect the corresponding connection state.

FIG. 7 is a diagram illustrating a characteristic of an audio signal.

As illustrated in FIG. 7, in the case of the audio signal, it can be seen that audio streaming data or audio data is periodically generated at an idle event interval.

The audio data is periodically (alternatively, at a specific time interval) generated according to a characteristic thereof.

Herein, the specific time interval at which the audio data is periodically generated may be expressed as the idle event interval.

The respective audio data is transmitted at each idle event interval.

Further, each audio data may be transmitted through a whole interval or a partial interval of the idle event interval.

As illustrated in FIG. 7, when the audio streaming data which is periodically or regularly is transmitted by using a BLE mechanism of FIG. 6 described above, the procedures (the advertisement and scanning procedures, the communication procedure, the disconnection procedure, and the like) illustrated in FIG. 6 need to be performed when the generated audio data is transmitted/received.

However, as illustrated in FIG. 7, the audio data is generally periodically generated and latency guarantee for transmission of the audio data is required regardless of the quantity of data.

However, when the procedures illustrated in FIG. 6 need to be performed whenever newly generated audio data is transmitted, there is a problem in that latency occurs in transmitting the audio data.

In the case of transmission of the audio data through hearing aids (HA) or a headset, since a data generation quantity is comparatively smaller, higher energy efficiency may be acquired when the BLE technology is used than the Bluetooth BR/EDR technology, but since the advertising, the connection, and the like need to be performed every data transmission in a data channel process of the BLE technology as described above, in particular, large overhead occurs in transmitting data, the latency guarantee absolutely required for transmitting the audio data may not be guaranteed.

Further, since the data channel process of the BLE technology aims at increasing energy efficiency by transmitting data which is generated shortly only when necessary and inducing a deep sleep of a BLE device in anther time domain, it may be difficult to apply the data channel process of the BLE technology illustrated in FIG. 6 to the transmission of the audio data which is periodically generated.

Due to the reasons, a new mechanism for transmitting/receiving the data which is periodically generated by using the BLE technology such audio streaming needs to be defined.

Hereinafter, the methods for transmitting/receiving the data (e.g., the audio data) which is periodically generated by using the BLE technology, which are proposed by the present invention will be described in detail.

That is, provided a method for transmitting the data which is periodically generated within a range not to hinder energy performance of the BLE by newly defining a channel for transmitting/receiving the data which is periodically generated and additionally defining a mechanism associated with the corresponding channel in the BLE technology.

The audio streaming data, the audio data, the audio streaming, the audio stream, and the like used in the present invention may be construed as the same meaning.

Hereinafter, the audio streaming data, the audio data, the audio streaming, the audio stream, and the like will be unified and used as the audio data.

Definition of Isochronous Channel and Mechanism Associated Therewith

The new channel, that is, the isochronous channel is defined in order to transmit the periodically generated data by using the BLE technology.

The isochronous channel is a channel used for transmitting isochronous data between devices (e.g., conductor-member) using an isochronous stream.

The isochronous data represents the data transmitted at the specific time interval, that is, periodically or regularly.

That is, the isochronous channel may represent a channel in which the data which is periodically generated, such as the audio data is transmitted/received in the BLE technology.

The isochronous channel may be used for transmitting/receiving the audio data to a single member, a set of one or more coordinated members or multiple members.

Further, the isochronous channel corresponds to a flushing channel which may be used for an isochronous stream such as the audio streaming or transmitting/receiving key data in another time domain.

Methods using the isochronous channel to be described below are operated independently from an advertising channel and a data channel used in the existing (v4.2 or less) BLE technology.

Further, in the methods proposed in the present invention, a new frequency channel and a new frequency hopping interval for the isochronous channel may be additionally defined.

The isochronous channel enables a conductor to transmit the isochronous stream such as flushable data (e.g., time-bound audio data) to one or one or more members by using the BLE.

Herein, the conductor may be expressed as a master and the member may be expressed as a slave.

Further, security may be configured or not configured in the isochronous channel.

In addition, the isochronous channel may be set up in various topologies in order to permit the isochronous stream to be transmitted between the single conductor and the member, between the single conductor and a coordinated pair of members producing stereo audio, such as the hearing aids or stereo headsets, and among multiple members which are synchronized by the same isochronous stream(s) as the single conductor.

Herein, the member may transmit the data to the conductor through the same isochronous channel.

Further, the isochronous channel may support transmission/reception of shard audio, public audio, and broadcast audio as well as supporting personal audio.

A setup procedure of the isochronous channel requests a hierarchy of profile level security and reliability requirements to satisfy different use cases.

Further, the isochronous channel may be used for various applications, and as a result, multiple audio sources and syncs may be configured and complicated topologies for making users to regularly change or share different audio streams may be configured.

FIG. 8 is a diagram illustrating one example of a home ecosystem for applications in which an isochronous channel can be used, which is proposed by the present invention.

That is, FIG. 8 illustrates one example of a space in which multiple audio conductors and members may move inside/outside mutual regions, to which the methods proposed by the present invention can be applied.

As illustrated in FIG. 8, presence of various conductors and members may mean that the isochronous channel is required as a method for announcing presence of the member so as for the member to acquire information required for configuring the isochronous channel.

The isochronous channel may also be used for transmitting/receiving non audio data.

The member may use the isochronous channels in order to determine whether notification messages which may include information acquired from the conductors which are present within a BLE communication range are present.

Further, the member may use the isochronous channels in order to receive a request for control information or service data from one or one or more devices which operates like a remote controller.

FIG. 9 is a diagram illustrating a use example of the isochronous channel proposed by the present invention.

That is, FIG. 9 illustrates one example in which a pair of hearing aids are connected with multiple conductors and remote control devices through the isochronous channel.

As illustrated in FIG. 9, a right hearing aid acts as the conductor that broadcasts the data through the isochronous channel.

Further, the right hearing aid may transmit a control request to all devices which are connected with the right hearing aid before, which include a remote control, a phone, a music player, a coordinated left hearing aid (HA-L), and the like of the right hearing aid.

The left hearing aid and/or the right hearing aid may act as the conductor in a scenario illustrated in FIG. 9.

FIG. 10 is a diagram illustrating one example of an operation state transition procedure in the BLE technology proposed by the present invention.

As described above, the isochronous (ISO) channel may operate together with the advertisement channel and the data channel of the BLE technology.

Referring to FIG. 10, the BLE device may transit an operation state to (1) a first connection state or (2) a second connection state from an advertisement state in order to transmit/receive the data.

Herein, the first connection state represents an operation state in which the BLE device and the second connection state represents an operation state in which the BLE device transmits/receives the data through the isochronous channel.

The BLE device may transit the operation state to the first connection state or the second connection state according to a type, a transmission format, and the like of data which is transmitted/received between the devices.

In detail, the BLE device generates the data channel in the advertisement channel for operating in the first connection state and generates the isochronous channel in the advertisement channel for operating in the second connection state.

Further, when the BLE device transits the operation state from the first connection state to the advertisement state, the BLE device cancels the generated data channel and when the BLE device transits the operation state from the second connection state to the advertisement state, the BLE device cancels the generated isochronous channel.

As one example, the BLE device transits the operation state from the second connection state to the advertisement state in order to transmit/receive the audio data. That is, the BLE device may transmit/receive the audio data through the isochronous channel in the second connection state.

Further, the BLE device transits the operation state from the advertisement state to the second connection state in order to transmit/receive the data which is irregularly generated or shortly generated.

That is, the BLE device may transmit/receive the corresponding data in the first connection state through the data channel.

As illustrated in FIG. 10, the BLE device generates the data channel as necessary in the advertisement state, and as a result, the operation state of the BLE device is transited to the first connection state and the BLE device transmits/receives the data through the generated data channel.

When the transmission/reception of the data through the data channel is completed, the BLE device terminates the generated data channel and returns to the advertisement state, that is, the advertisement channel.

Similarly, the BLE device generates the isochronous channel as necessary in the advertisement state, and as a result, the operation state of the BLE device is transited to the second connection state and the BLE device transmits/receives the data through the generated isochronous channel.

When the transmission/reception of the data through the isochronous channel is completed, the BLE device terminates the generated isochronous channel and returns to the advertisement state, that is, the advertisement channel.

As described above, the isochronous channel is generated for transmitting/receiving the data which is periodically generated, such as the audio data and the data channel may be generated for transmitting the data which is irregularly or shortly transmitted/received.

FIG. 11 is a diagram illustrating various examples of isochronous stream transmission through the isochronous channel proposed by the present invention.

Various topologies in which the isochronous stream is transmitted are illustrated through FIGS. 11A to 11D and in FIGS. 11A to 11D, the member(s) and the conductors establishing the isochronous channels are illustrated.

Two members which may receive the same or different isochronous streams (e.g. a mono, joint stereo or separate left and right audio streams), Three groups of members, with each group synchronized to a separate isochronous stream, A single member receiving a single isochronous stream from a single isochronous channel.

The conductor establishes multiple isochronous channels sharing a characteristic including an anchor point of the isochronous channel, and as a result, the anchor points may be performed by the members of the conductor at a common time. The isochronous streams are mentioned as 'ensemble'.

A single isochronous channel that transmits the single isochronous stream to the single member does not become an example of the ensemble and when such a point-to-point topology is generally used for transmitting the audio data, the point-to-point topology may be mentioned as unicast.

Further, the isochronous channel may be used for broadcasting the control information to one or one or more members and the isochronous channel may individually respond to broadcast transmission and selectively request more information.

Therefore, the conductor may operate mutually with multiple remote control devices. As illustrated in FIG. 9, the BLE device may act as the member of the isochronous channel or the conductor of another BLE device.

That is, the BLE devices may act as both the conductor and the member in order to establish the multiple isochronous channels.

FIGS. 12 and 13 are diagrams illustrating another example of a data transmitting method using an isochronous channel proposed by the present invention.

In detail, FIG. 12 illustrates one example of a unicast transmission method and FIG. 13 illustrates one example of a broadcast transmission method.

First, the unicast transmission method through the isochronous channel is described with reference to FIG. 12.

In the case of the unicast transmission, the devices may selectively operate the isochronous channel for one or one or more unicast transmission.

As illustrated in FIG. 12, the master may unicast the same or different data to predetermined connected or selected slaves.

In some cases, the master may generate dual isochronous channels for bidirectional communication with the slave.

That is, the master generates the single isochronous channel with one slave and generates another isochronous channel with the slave to configure the dual isochronous channels.

Herein, a concept of the generation of the dual isochronous channels may mean that each of a downlink isochronous channel and an uplink isochronous channel is generated for the bidirectional communication between one master and the one slave and mean that the isochronous channel is each generated between one master and two or more slaves.

Next, the broadcast transmission using the isochronous channel will be described with reference to FIG. 13.

In FIG. 13, the broadcast transmission through the isochronous channel is performed by multicast transmission differently from a generally used broadcast transmission method (that is, a method that transmits the data to all devices).

That is, the broadcast transmission through the isochronous channel in the BLE is a mechanism that broadcasts the data only to the slave which is subordinate to the generated isochronous channel.

That is, the master broadcasts the data only permitted slaves through the isochronous channel.

Accordingly, the broadcast transmission through the isochronous channel in the BLE needs to be appreciated as a multicast transmission concept that transmits the data to a specific group.

FIG. 14 is a diagram illustrating examples of an isochronous channel packet format which can be applied to the method proposed by the present invention.

A packet format transmitted through the isochronous channel may be types illustrated in FIGS. 14A and 14B, but the present invention is not limited thereto and the packet format may have a type of another format.

All isochronous channels may have a packet format defined in Bluetooth specification 4.2 supporting the isochronous data PDU of 2 to 257 octets as illustrated in FIG. 14A.

FIG. 14A illustrates one example of an extended protocol data unit packet format and the extended PDU packet format 1410 may include a preamble 1411, an access address 1412, a protocol data unit (PDU) 1413, and a cyclic redundancy check (CRC) 1414.

The preamble may be 1 octet, the access address may be 4 octets, the PDU may be 2 to 257 octets, and the CRC may be 3 octets.

FIG. 14B illustrates one example of an isochronous packet format and an isochronous packet (alternatively, an isochronous channel PDU) 1420 may include a header 1421 of 16 bits and a payload 1422 having a size of 0 to 255 octets.

Further, the isochronous packet may include a length field having a size of 8 bits, which verifies a length of data positioned next to the header.

The data length of the isochronous packet may be diversified at each isochronous channel interval and the length may be limited by a channel parameter compelled by the conductor. Further, the isochronous packet may further include a message integrity check (MIC) field.

FIG. 15 is a diagram illustrating one example of a basic format of the isochronous channel transmission to which the methods proposed by the present invention can be applied.

Referring to FIG. 15, an isochronous channel timing is also described together.

The conductor determines timings of all packets transmitted through the isochronous channel.

The member may not personally configure the isochronous channel timing, but provide a preferred isochronous channel timing to the conductor.

The conductor establishes (alternatively, configures) an anchor point 1510 representing a time when new information is transmitted. As illustrated in FIG. 15, the anchor points are spaced apart from each other by an isochronous connection interval 1520 in a multiple format of 1.25 ms (1.25 ms*n, n represents a natural number) and a range of the isochronous connection interval is 5 ms to 318.75 ms.

The isochronous connection interval is defined at the time when the conductor establishes the isochronous connection channel and fixed for a time when the isochronous connection channel is continued.

In the isochronous connection interval, another transmission may follow the transmission by the conductor at the anchor point. The another transmission may be retransmission by the conductor and acknowledgement response (ACK) by the member.

Various data transmitting/receiving methods using the isochronous channel will be described with reference to FIGS. 16 to 28.

First, the broadcast transmission method through the isochronous will be described in FIGS. 16 to 24 and the unicast transmission method through the isochronous channel will be described in FIGS. 25 to 28.

In FIGS. 16 to 28, the master transmits the data through the isochronous channel and the slave receives the corresponding data through the isochronous channel.

FIG. 16 is a diagram illustrating one example of a method for transmitting/receiving data through an isochronous channel proposed by the present invention.

That is, FIG. 16 illustrates one example of a method that repeatedly broadcasts data through the isochronous channel.

Both the unicast transmission and the broadcast transmission are enabled through the isochronous channel and FIG. 16 illustrated a repetition transmissions based broadcast transmission method.

That is, when one master transmits the data to multiple slaves, the master broadcasts the same data through the isochronous channel repeatedly at the maximum number of retransmission times for transmission reliability.

As illustrated in FIG. 16, whenever new data (e.g., the audio data) is generated, the master transmits the corresponding data through the isochronous channel and the master broadcasts the corresponding data to the slaves repeatedly at the maximum number of transmission times.

A sub event interval is configured as much as the maximum number of retransmission times. The repeatedly transmitted data is transmitted once every sub event interval. However, all retransmitted data is transmitted during an ISO event interval.

In FIG. 16, TX0, TX1, TX2, and TX3 represent the same data transmitted every sub event interval and the respective values represent the number of retransmission times.

Herein, the ISO event interval means a generation period of new data generated in CODEC, and the like.

The ISO event interval may be constituted by n sub event intervals and one idle event interval.

The ISO event interval may be expressed as an isochronous connection interval, the sub event interval may be expressed as an isochronous connection event or a first interval, and the idle event interval may be expressed as a second interval.

The n value may be determined according to the maximum number n of retransmission times. That is, when the maximum number of retransmission times of the same data is 4, the n value becomes 4.

Further, the sub event interval represents a transmission interval of each same data.

Accordingly, the ISO event interval may be defined as shown in Equation 1 given below.

$$\text{ISO Event interval} = (K * \text{Sub\_Event}) + \text{Idle\_Event} \quad \text{[Equation 1]}$$

Where, a value of K represents the number of repeated transmission times of the same data and a default value of K may be set to 4.

In FIG. 16, the master broadcasts the same data repeatedly at the maximum number of retransmission times. In this case, the maximum number of retransmission times may be determined according to a system and in the case of FIG. 16, the maximum number of retransmission times is 4.

When the master broadcasts repeatedly at the maximum number of retransmission times during the ISO event interval, the master enters a power saving state during the idle event interval.

The power saving state may mean a sleep state or an idle state.

Meanwhile, the slave repeatedly performs wakeup and sleep according to a duty cycle during the ISO event interval.

The slave need not particularly synchronize with the ISO event interval and after the slave wakes up, the slave may successfully receive broadcasting data transferred from the master only once.

Thereafter, since the slave need not receive the data which is repeatedly transmitted from the master, the slave enters the power saving state (sleep or idle) for increasing energy efficiency, that is, for power saving.

The method may be advantages in terms of the energy efficiency of the slave when the slave is unspecified many persons or the number of slaves is large.

Further, the master may broadcast data by performing frequency hopping every each sub event interval.

FIG. 17 is a flowchart illustrating one example of an operation method of a master and FIG. 18 is a flowchart illustrating one example of an operation method of a slave in FIG. 16.

Referring to FIG. 17, the master waits up to a start time of the ISO event interval in order to transmit newly generated data (e.g., the audio data) (S1710).

Thereafter, the master broadcasts the newly generated data to the slaves at the ISO event interval (S1720).

Herein, the master broadcasts the data once every sub event interval at the maximum number of retransmission times. In this case, the master increases a count one by one whenever the master transmits the data.

Thereafter, the master determines whether a count value reaches the maximum number of retransmission times (S1730).

As a result of the determination, when the count value reaches the maximum number of retransmission times, the master enters the power saving state (alternatively, a power saving mode) to maintain the power saving state up to a subsequent ISO event interval (S1740).

When the count value does not reach the maximum number of retransmission times, the master continuously broadcasts the data to the slaves repeatedly every sub event interval until the count value reaches the maximum number of retransmission times.

That is, the master transmits the data repeatedly until the count value reaches the maximum number of retransmission times.

Thereafter, the master cancels the power saving state at the subsequent ISO event interval (S1750). Herein, the master changes the transmitted data to new data.

Thereafter, the master broadcasts the new data through the isochronous channel again through procedures S1710 to S1750.

Next, FIG. 18 will be described.

Referring to FIG. 18, the slave waits for receiving data from the master until the slave wakes up or up to the ISO event interval (S1810).

Thereafter, the slave receives the data from the master at the ISO event interval and counts the number of data retransmission times (S1820).

Thereafter, the slave determines whether the count value reaches the maximum number of retransmission times (S1830).

As a result of the determination, when the count value reaches the maximum number of retransmission times, the slave enters the power saving state within the ISO event interval to maintain the power saving state up to the subsequent ISO event interval (S1860).

Herein, the slave may receive information on the maximum number of retransmission times from the master in advance.

As the determination result, when the counter value does not reach the maximum number of retransmission times, the slave determines whether to receive the data from the master (S1840).

As the determination result, when the slave successfully receives the data from the master, the slave maintains the power saving state up to the subsequent ISO event interval by entering step S1860, that is, the power saving state.

As the determination result, when the slave may not receive the data from the master, steps S1820 to S1840 are repeatedly performed.

FIG. 19 is a diagram illustrating yet another example of a method for transmitting/receiving data through an isochronous channel proposed by the present invention.

FIG. 19 illustrates an NACK based broadcast transmission method through the isochronous channel.

Similarly, in FIG. 19, the broadcast transmission method means a kind of multicast transmission in which the master broadcasts the data only to permitted slaves.

In FIG. 19, an NACK based repeated broadcast transmission method and a method for accessing a collision which may occur when two or more slaves simultaneously perform NACK transmission are provided.

Herein, the NACK transmission by the slave may be expressed as NACK frame transmission by the slave.

In FIG. 19, another NACK based repeated broadcast transmission method is provided in order to solve a problem in that the energy efficiency deteriorates at the time of the repeated broadcast transmission of the data in FIG. 18.

Further, in FIG. 19, even when the collision occurs due to simultaneous transmission of the NACK by multiple slaves, a method that can detect the collision to provide a method that can repeatedly broadcast the data to the slave.

As illustrated in FIG. 19, the master repeatedly broadcasts the data which is periodically generated, such as the audio data through the isochronous channel during the ISO event interval.

Herein, when the slaves (slave 1 and slave 2) successfully receive the broadcast data from the master, the slaves enter the power saving state (sleep or idle) for the power saving and maintains the power saving state up to the subsequent ISO event interval.

However, when the slaves may not receive the broadcast data from the master at the sub event interval, each of the slaves transmits the NACK to the master.

When the master receives the NACK from the slaves, the master retransmits the broadcast data at the subsequent sub event interval.

When the master may not receive the NACK from the slaves at the sub event interval (including a case where energy detection is unsuccessful), the master stops the retransmission of the broadcast data and enters the power saving state for the power saving.

The power saving state may be the sleep state or the idle state.

However, even though the master may not receive the NACK, the slaves may not normally receive the broadcast data from the master and even in this case, the master may retransmit the broadcast data to the slaves.

That is, when two or more slaves may not successfully receive the broadcast data, the respective slaves may simultaneously transmit the NACK to the master.

As a result, the collision may occur among the NACK transmissions, and as a result, the master may not receive the NACK.

Further, even when external interference devices including a Wi-Fi device, and the like operate at the same frequency to cause an interference action, the master may not receive the NACK.

In order to prevent such a case, the master additionally performs the energy detection at the sub event interval to repeatedly transmit the broadcast data.

That is, when the master may not receive the NACK from the slave due to the collision among the NACK transmission and interference caused by other devices, a phenomenon may be solved, in which the master may not repeatedly transmit the broadcast data to the slave by additionally performing the energy detection in order to retransmit the broadcast data.

In detail, even though the master may not receive the NACK from the slave after transmitting the broadcast data to the slaves through the isochronous channel, when an energy detection result value is equal to or more than a threshold at the corresponding sub event interval, the master retransmits the broadcast data to the slave at the subsequent subs event interval.

Herein, the case where the master receives the NACK may mean that decoding the NACK transmitted from the slaves is successful.

That is, the master repeatedly broadcast the same data to the slaves when the energy detection is successful even though decoding the NACK is unsuccessful (even though the master may not receive the NACK).

The case where the energy detection is successful represents a case where a strength of a received signal is larger than a threshold at the sub event interval.

Accordingly, the master may retransmit the broadcast data to the slaves through the energy detection at the corresponding sub event interval even when the collision occurs among two or more NACK transmissions.

In summary, when the master receives the NACK from slave 1, the master retransmits the same data at the subsequent sub event interval.

Further, when the collision occurs due to the simultaneous NACK transmission of slave 1 and slave 2, the master retransmits the broadcast data to slave 1 and slave 2 at the subsequent sub event interval.

Since the method of FIG. 19 may prevent the master from unnecessarily retransmitting the broadcast data, the energy efficiency may be significantly enhanced.

FIG. 20 is a flowchart illustrating one example of the operation method of the master in the method of FIG. 19 and FIG. 21 is a flowchart illustrating one example of the operation method of the slave in the method of FIG. 19.

First, FIG. 20 is described.

Since steps S2010, S2020, S2070, and S2080 are the same as steps S1710, S1720, S1750, and S1760 of FIG. 17, only differences will be described.

After S2020, the master performs the energy detection at the sub event interval and receives the NACK from the slaves (S2030).

Thereafter, the master determines whether decoding the received NACK is successful (S2040).

As the determination result, when decoding the NACK is successful, the master retransmits the same data to the slaves at the subsequent sub event interval.

Thereafter, when the master retransmits the same data at the maximum number of retransmission times, the master enters the power saving state to maintain the power saving state up to the subsequent ISO event interval.

However, as the determination result, when decoding the NACK is unsuccessful, the master determines whether to retransmit the same data according to the energy detection result value in step S2030.

That is, the master determines whether the energy detection result value is larger than a threshold (S2050).

As the determination result, when the energy detection result value is larger than the threshold, that is, when an energy amount of a predetermined intensity is detected, the master retransmits the same data to the slaves (S2060).

When the energy detection result value is smaller than the threshold as the determination result, the master enters the power saving state and maintains the power saving state up to the subsequent sub event interval.

Next, FIG. 21 will be described.

Since steps S2110 to s2140 and S2160 and S2170 are the same as steps S1810 to S1860 of FIG. 18, only differences will be described.

In step S2140, when the slave receives the data from the master, the slave enters the power saving state up to the subsequent ISO event interval to wait for receiving subsequent data.

However, when the slave may not receive the data, the slave transmits the NACK (S2150) and waits for retransmission at the subsequent sub event interval.

FIG. 22 is a diagram illustrating yet another example of a method for transmitting/receiving data through an isochronous channel proposed by the present invention.

FIG. 22 as an NACK based broadcast transmission method using the isochronous channel illustrates a method for solving the collision which may occur due to the simultaneous NACK transmission in FIGS. 1 to 21.

That is, FIG. 22 illustrates a method that allocates an NACK transmission time slot to the respective slaves in advance so as to prevent the collision among NACKs transmitted from multiple slaves.

The master allocates the NACK transmission time slots to the respective slaves, respectively in advance to prevent the NACK from being simultaneously transmitted from the beginning.

The master may find the total number or a total length of the NACK time slots, that is, the number of permitted or associated slaves during establishing the isochronous channel.

That is, since the master may find the total number of NACKs which may be received at one sub event interval in advance, the master allocates the NACK time slots to the respective slaves as large as the total number of NACKs.—{ }—

The NACK transmission time slots are allocated next to a broadcast data transmission interval as many as the slaves.

Further, an order (alternatively, positions) of the time slots allocated to the respective slaves may be determined by considering a distance between the master and the slave, a power state of the slave, and the like.

The master transmits the broadcast data to the slaves at the sub event interval and waits for receiving the NACK from the respective slaves during an NACK reception time slot.

Herein, only when the slave may not receive the broadcast data, the slave transmits the NACK to the master and the slave transmits the NACK at the allocated NACK transmission time slot.

In FIG. 22, when the master receives the NACK from at least one slave, the master retransmits the broadcast data at the subsequent sub event interval and when the master does not receive the NACK during all allocated NACK transmission time slots, the master stops retransmitting the broadcast data.

The slave that receives the broadcast data from the master, that is, the slave that does not transmit the NACK enters the power saving state to maintain the power saving state up to the subsequent ISO event interval.

The method of FIG. 22 is advantageous in that since the NACK is transmitted through each allocated NACK transmission time slot, the collision among the NACK transmission does not occur, and as a result, transition of the operation states of the master and/or the slave is not clear.

FIG. 23 is a flowchart illustrating one example of the operation method of the master in the method of FIG. 22 and FIG. 24 is a flowchart illustrating one example of the operation method of the slave in the method of FIG. 22.

First, FIG. 23 is described.

Since steps S2310 to S2330 and S2360 to S2380 are the same as steps S2010 to S2030 and S2060 to S2080 of FIG. 20, only differences will be described.

The master allocates the NACK transmission time slots to the respective slaves, respectively.

After step S2330, the master determines whether to receive the NACK at the NACK transmission time slots corresponding to the respective slaves (S2340).

As the determination result, when the master may not receive the NACK at all NACK transmission time slots, the master enters the power saving state to waits for the subsequent ISO event interval.

Thereafter, the master broadcasts new data to the slaves at the subsequent ISO event interval.

As the determination result, when the master receives the NACK from at least one slave, the master determines whether data retransmission reaches the maximum number of retransmission times (S2350).

As the determination result, when the data retransmission does not reach the maximum number of retransmission times, the master retransmits the data to the slaves (S2360).

As the determination result, when the data retransmission reaches the maximum number of retransmission times, the master enters the power saving state and waits for the subsequent ISO event interval (S2370).

Next, FIG. 24 will be described.

Since steps S2410 to S2440 and S2460 to S2470 are the same as steps S2110 to S2140 and S2160 to S2170 of FIG. 21, only differences will be described below.

In step S2440, when the slave may not receive the data from the master, the slave transmits the NACK to the master at the NACK transmission time slot allocated from the master (S2350).

Next, the unicast transmission method using the isochronous channel will be described in detail with reference to FIGS. 25 to 28.

FIG. 25 is a diagram illustrating yet another example of a method for transmitting/receiving data through an isochronous channel proposed by the present invention.

FIG. 25 illustrates a single ACK based broadcast transmission method using the isochronous channel.

That is, FIG. 25 illustrates a method in which a single master unicasts data to a single slave device through the isochronous channel.

The unicast transmission through the isochronous channel is based on an ACK transmission mode of the slave unlike the broadcast transmission of FIGS. 16 to 24 described above.

Herein, the ACK based unicast transmission may be divided into single-ACK unicast transmission and dual-ACK unicast transmission according to the number of slaves.

The dual ACK mode unicast method will be described in detail in FIGS. 26 to 28 to be described below and first, the single ACK mode unicast transmission is described.

In the single-ACK based unicast transmission of FIG. 25, the master transmits unicast-transmits generated audio streaming data to the slave at the ISO event interval.

Thereafter, the master waits for receiving the ACK at an ACK reception time slot after the unicast data transmission.

The ACK reception interval, that is, the ACK reception time slot may be allocated from the master in advance and when the slave receives the unicast data, the slave transmits the ACK to the master at the ACK reception time slot.

In the case of FIG. 25, it is described that the number of slaves is one as an example, but when multiple slaves are present, the master allocates time slots to transmit the ACK to the slaves, respectively to prevent the collision among the ACKs transmitted by the respective slaves.

Meanwhile, when the slave may not successfully receive the unicast data, the slave may not transmit the ACK or may transmit the ACK including retransmissions request information therein to the master.

The retransmission request information included in the ACK may information representing that the unicast data may not be received or a retransmission request of the unicast data.

When the master receives the ACK from the slave, the master hereafter enters the power saving state to wait for the subsequent ISO event interval.

Further, the slave receives the unicast data and transmits the ACK to the master and thereafter, enters the power saving state to wait for subsequent data reception.

In the single-ACK based unicast transmissions method of FIG. 25, it is not particularly assumed that the master and the slave are mapped to each other one to one and the method of FIG. 25 may be extended even when the master and N slaves transmit/receive the data to/from each other even in the case of 1:N of the master and the slave.

As illustrated in FIG. 25, the length of an IFS for receiving the ACK (AIFS) may be configured to be larger than an actual ACK transmissions interval (alternatively, ACK reception interval).

This is to maintain compatibility with the AIFS interval length in the dual ACK based unicast transmission method of FIG. 26.

In FIG. 25, an example that the AIFS is configured to be two times larger than the actual ACK transmission interval is illustrated and the length of the AIFS interval may vary depending on a system environment.

That is, by adjusting the length of the AIFS interval, the method of FIG. 25 may be used together with the method of FIG. 26.

FIG. 26 is a diagram illustrating yet another example of a method for transmitting/receiving data through an isochronous channel proposed by the present invention.

FIG. 26 illustrates a dual ACK based broadcast transmission method using the isochronous channel.

The dual ACK based unicast transmission method represents that the single master performs unicast transmission of the same data to two slaves through the isochronous channel.

The method of FIG. 26 may be regarded a method acquired by extending the method of FIG. 25 to two slaves and as an implementation example of the method of FIG. 26, two slaves may be hearing aids which are present as a pair of left and right slaves.

As illustrated in FIG. 26, the master simultaneously transmits the same unicast data to two slaves, that is, slave 1 and slave 2 and each slave transmits to the master a response thereto. Herein, the response may be the ACK indicating that the data is successfully received.

Similarly, the master allocates the ACK transmission time slots to the respective slaves, respectively.

The order in which the ACK transmission time slots are allocated may be configured by considering the position of the slave, the power state, and the like.

That is, the mater waits for receiving the ACK at the ACK transmission time slots allocated to the respective slaves from two slaves selected during the AIFS (the IFS for receiving the ACK) interval, respectively just after transmitting the unicast data.

The master retransmits the unicast data every sub event interval until receiving all of two ACKs from two slaves.

When the master receives the ACK only from any one slave, the master retransmits the unicast data only to the slave that may not receive the ACK.

Further, when the slave successfully receives the unicast data from the master, the slave transmits the ACK to the master at the corresponding ACK transmission time slot.

Thereafter, when the master receives the ACKs from all of two slaves, the master stops retransmitting the unicast data and enters the power saving state (idle state or sleep state).

Similarly, that slave that successfully receives the unicast data, that is, transmits the ACK to the master enters the power saving state up to the subsequent isochronous event interval.

Even in the method of FIG. 26, when data to be transmitted/received is not present at the corresponding ISO event interval, the master and the slave enter the power saving state during the residual interval of the corresponding ISO event interval to increase the energy efficiency.

Herein, all power saving states is maintained only at the corresponding ISO event interval and the power saving state is cancelled in the case of entering a new ISO event interval.

In FIG. 26, it is described that the number of slaves that receive the unicast data is two as an example, but the number of slaves may be extended as necessary.

FIG. 27 is a flowchart illustrating one example of the operation method of the master in the method of FIG. 26 and FIG. 28 is a flowchart illustrating one example of the operation method of the slave in the method of FIG. 26.

First, FIG. 27 is described.

Since steps S2710, 2720, and S2740 to S2770 are the same as steps S2310, 2320, and S2350 to S2380 of FIG. 23, only differences will be described below.

After S2720, the master determines whether to receive the ACKs from all slaves (S2730).

As the determination result, when the master receives the ACKs from all slaves, the master enters the power saving state to wait for the subsequent ISO event interval (S2760).

Herein, the respective slaves may be allocated with the ACK transmission time slots from the master, respectively.

Accordingly, each slave transmits the ACK to the master at the allocated ACK transmission time slot.

As the determination result, when the master may not receive the ACK from the slave, the master determines whether the data transmission reaches the maximum number of retransmission times (S2740).

As the determination result, when the data transmission reaches the maximum number of retransmission times, the master stops retransmitting the data and enters the power saving state (S2760).

However, as the determination result, when the number of data transmission times does not reach the maximum number of retransmission times, the master retransmits the unicast data (S2750).

In this case, the master retransmits the unicast data only to the slave that may not receive the ACK until the number of data transmission times reaches the maximum number of retransmission times.

Next, FIG. 28 will be described.

Since steps S2810 to S2840 and S2860 and S2870 are the same as steps S2410 to S2440 and S2460 and S2470 of FIG. 24, only differences will be described below.

In step S2840, when the slave receives the data from the master, the slave transmits the ACK to the master at the CK transmission time slot allocated from the master (S2850).

Thereafter, the slave maintains the power saving state up to the subsequent ISO event interval and waits for receiving new data at the subsequent ISO event interval (S2870).

In a data receiving operation of the slave at each ISO event interval, steps S2810 to S2870 are repeatedly performed.

Furthermore, the respective drawings are separately described for easy description, but the embodiments described in the respective drawings can be designed to be merged to implement a new embodiment. In addition, designing a computer readable having a program for executing embodiments described previously recorded therein is included in the claims of the present invention according to needs of those skilled in the art.

In the method for transmitting/receiving data using the isochronous channel according to the present invention, the constitutions and methods of the described embodiments cannot be limitedly applied, but all or some of the respective exemplary embodiments may be selectively combined and configured so that various modifications of the embodiments can be made.

Meanwhile, the method for transmitting/receiving data using the isochronous channel according to the present invention can be implemented as a code a processor readable code in a processor readable recording medium provided in a network device. The processor readable recording medium includes every type of recording device in which data readable by a processor is stored. Examples of the processor readable recording medium include ROM, RAM, CD-ROM, a magnetic tape, a floppy disk, an optical data storing device and the processor readable recording medium may also be implemented in a form of a carrier wave such as transmission through the Internet. Further, the processor readable recording medium is distributed in computer systems connected through a network and a processor readable code is stored therein and executed in a distributed manner.

While the preferred embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

In addition, in the present invention, both a product invention and a method invention are described and description of both inventions may be complementally applied as necessary.

INDUSTRIAL APPLICABILITY

In the present invention, used is the method for transmitting/receiving data by using the Bluetooth low energy (BLE) which is the short-range low power wireless technology.

The invention claimed is:

1. A method for transceiving audio data by using Bluetooth low energy in a wireless communication system supporting Bluetooth communication by a first device, the method comprising:

establishing at least one isochronous channel for transmitting isochronous data with at least one second device by setting an anchor point representing a time at which new information is transmitted;

transmitting the audio data to the at least one second device through at least one established isochronous channel during a first interval starting from the anchor point;

allocating to the at least one second device a response transmission time slot in which a response associated with whether to receive the audio data can be received from the at least one second device; and receiving the response associated with the reception of the audio data from the at least one second device through the allocated response transmission time slot, wherein the first interval includes at least one second interval in which initial transmissions of the audio data and retransmission of the audio data occur, wherein the initial transmission of the audio data occurs at the anchor point of the first interval, and wherein the response transmission time slot is allocated for each of the at least one second device.

2. The method of claim 1, further comprising:
retransmitting the audio data to the at least one second device during at least one second interval.

3. The method of claim 2, wherein the audio data is retransmitted once for each second interval.

4. The method of claim 2, wherein when a non-acknowledgement response (NACK) indicating that the audio data is not received from at least one second device is received, the audio data is retransmitted to the at least one second device.

5. The method of claim 2, further comprising:
stopping retransmitting the audio data when a non-acknowledgement response (NACK) indicating that the audio data is not received from the at least one second device is not received; and
entering a power saving state from a time when the retransmission of the audio data is stopped.

6. The method of claim 2, wherein the retransmitting of the audio data includes
performing energy detection during at least one second interval when a non-acknowledgement response (NACK) indicating that the audio data is not received from the at least one second device is not received,
comparing a result of the energy detection and a predetermined threshold, and
retransmitting the audio data to the at least one second device during at least one second interval based on the comparing.

7. The method of claim 2, wherein when an acknowledgement (ACK) response indicating that the audio data is received from the at least one second device is not received, the audio data is retransmitted only to a second device that does not transmit the ACK response.

8. The method of claim 2, further comprising:
stopping retransmitting the audio data when an acknowledgement response (ACK) indicating that the audio data is received from the at least one second device is all received; and
entering a power saving state from a time when the retransmission of the audio data is stopped.

9. The method of claim 1, further comprising:
wherein the first interval further includes a third interval that operates in a power saving state,
entering the power saving state during the third interval; and
terminating the power saving state for transmitting new audio data during a subsequent first interval.

10. The method of claim 1, wherein the number of one or more second intervals is determined by the maximum number of retransmission times of the audio data.

11. The method of claim 1, wherein the allocated response transmission time slot is positioned next to an audio data transmission interval.

12. The method of claim 1, wherein the audio data is transmitted through frequency hopping for each second interval.

13. The method of claim 1, further comprising:
receiving an advertising message from at least one second device;
transmitting a scan request message for acquiring additional information to the at least one second device; and
receiving a scan response message corresponding to a response to the scan request from at least one second device.

14. The method of claim 1, wherein the audio data is transmitted to the at least one second device by a broadcast or a unicast method.

15. The method of claim 1, wherein the first device is a master or a conductor,
the at least one second device is a slave or a member,
the first interval is an isochronous connection interval or an isochronous event interval, and
the second interval is a sub event interval or an isochronous connection interval.

16. A first device for transceiving audio data by using Bluetooth low energy in a wireless communication system supporting Bluetooth communication, the first device comprising:
a transceiver; and
a processor functionally connected with the transceiver,
wherein the processor:
establishes at least one isochronous channel for transmitting the audio data with at least one second device by setting an anchor point representing a time at which new information is transmitted,
controls the transceiver to transmit the audio data to the at least one second device through at least one established isochronous channel during a first interval starting from the anchor point,
allocates to the at least one second device a response transmission time slot in which a response associated with whether to receive the audio data can be received from the at least one second device, and
controls the transceiver to receive the response associated with the reception of the audio data from the at least one second device through the allocated response transmission time slot,
wherein the first interval includes at least one second interval in which initial transmissions of the audio data and retransmission of the audio data occur,
wherein the initial transmission of the audio data occurs at the anchor point of the first interval, and
wherein the response transmission time slot is allocated for each of the at least one second device.

* * * * *